United States Patent [19]
Moses et al.

[11] Patent Number: 5,704,790
[45] Date of Patent: *Jan. 6, 1998

[54] METHODS OF PLAYING GAMES WHICH ENHANCE MATHEMATICAL UNDERSTANDING

[75] Inventors: Robert Parris Moses, Cambridge, Mass.; Maisha V. Moses; Tabasuri W. Moses, both of Jackson, Miss.

[73] Assignee: Robert P. Moses, Cambridge, Mass.

[*] Notice: The term of this patent shall not extend beyond the expiration date of Pat. No. 5,520,542.

[21] Appl. No.: 653,616

[22] Filed: May 24, 1996

Related U.S. Application Data

[63] Continuation-in-part of Ser. No. 371,074, Jan. 10, 1995, Pat. No. 5,520,542.

[51] Int. Cl.⁶ .......................... G09B 1/00; G09B 19/00; G09B 23/02
[52] U.S. Cl. .......................... 434/209; 434/188; 434/207
[58] Field of Search .......................... 434/207, 209, 434/205, 188; 273/299, 302

[56] References Cited

U.S. PATENT DOCUMENTS

| | | | |
|---|---|---|---|
| 1,415,019 | 5/1922 | Crossland | 434/209 |
| 1,694,405 | 12/1928 | Troidl | 434/207 |
| 2,839,844 | 6/1958 | Lehnkering | 434/209 |
| 4,512,746 | 4/1985 | Turner | 434/209 |
| 5,083,793 | 1/1992 | Sanford | 434/207 |
| 5,242,171 | 9/1993 | Hata | 434/207 |
| 5,318,447 | 6/1994 | Mooney | 434/209 |
| 5,520,542 | 5/1996 | Moses | 434/209 |

*Primary Examiner*—Paul J. Hirsch
*Attorney, Agent, or Firm*—Millen, White Zelano, & Branigan, P.C.

[57] ABSTRACT

A game for enhancing mathematical skills is played in the a classroom with teams of players or individual players. In accordance with one embodiment, the game utilizes a branched lattice having a central starting point and a plurality of terminal points. The lattice is placed on the floor of a classroom. In playing the game, students select three numbers from a location on the classroom wall and factor those three numbers to find the prime factors of the numbers, which prime factors are then recorded in input/output tables. The tables have an output line or column in which the output value "−1" is written if the number of factors is odd; the output value "0" is written if the output value includes repeated primes, indicating raising a prime to a power; and the output value "+1" is written if the number of prime factors is even. The output values are used to locate the input/output tables, which are on slips of paper, at correct terminal points of the lattice. The path to each of the terminal points comprises three legs of the lattice, with each of the legs being defined by one of the output values "−1," "0" and "+1." A frequency table is provided to retire the number chips in columns in accordance with their output values. In accordance with additional embodiments of the invention, the game is played in combination with a Venn diagram puzzle having color chips which are assembled in accordance with the results of casting color-coded dice. In accordance with still further embodiments of the invention, the lattice is configured as a three-dimensional, color-coded array, with legs extending parallel to one another being of the same color. In accordance with still a further embodiment of the invention, a lattice with there branches has "bumping locations" at the termini of the branches which are used in scoring teams playing the game. The methods of playing the various embodiments of the games preferably employ computer generated graphics and computer programs.

14 Claims, 25 Drawing Sheets

| INPUT | PRIME FACTORS | OUTPUT |
|---|---|---|
| 30 | 3 x 2 x 5 | -1 |
| 15 | 3 x 5 | +1 |
| 8 | 2 x 2 x 2 | 0 |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

FIG. 4a

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

FIG. 4b

SCORE SHEET

| FLAG INFORMATION | | FLAG | FLAGWAY | FREQ. STAND |
|---|---|---|---|---|
| INPUT | OUTPUT | | | |
| 30 | -1 | 10 | 10 | 10 |
| | | | | |
| | | | | |
| | | | | |
| | | | | |
| | | | | |
| | | | | |
| | | | | |
| | | | | |

FIG. 7

| LATTICE ROUTE CHART |||||||
|---|---|---|---|---|---|
| ROUTES | TEAM | ROUTES | TEAM | ROUTES | TEAM |
| 0 0 0 | | +1 0 0 | | -1 0 0 | |
| 0 0 +1 | | +1 0 +1 | | -1 0 +1 | |
| 0 0 -1 | | +1 0 -1 | | -1 0 -1 | |
| 0 +1 0 | | +1 +1 0 | | -1 +1 0 | |
| 0 +1 +1 | | +1 +1 +1 | | -1 +1 +1 | |
| 0 +1 -1 | | +1 +1 -1 | | -1 +1 -1 | |
| 0 -1 0 | | +1 -1 0 | | -1 -1 0 | |
| 0 -1 +1 | | +1 -1 +1 | | -1 -1 +1 | |
| 0 -1 -1 | | +1 -1 -1 | | -1 -1 -1 | |

FIG. 8
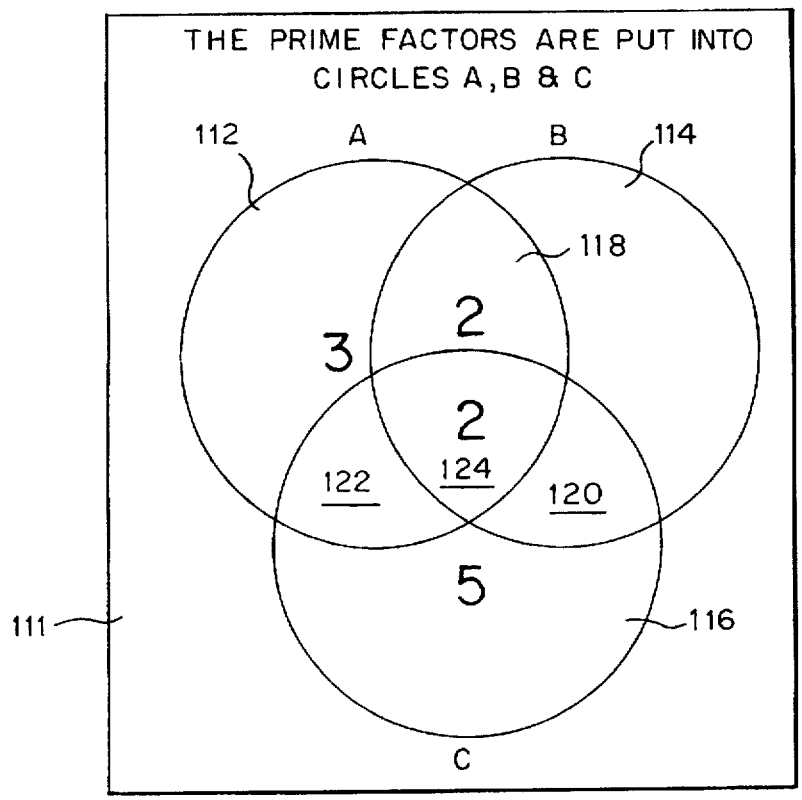
FIG. 9
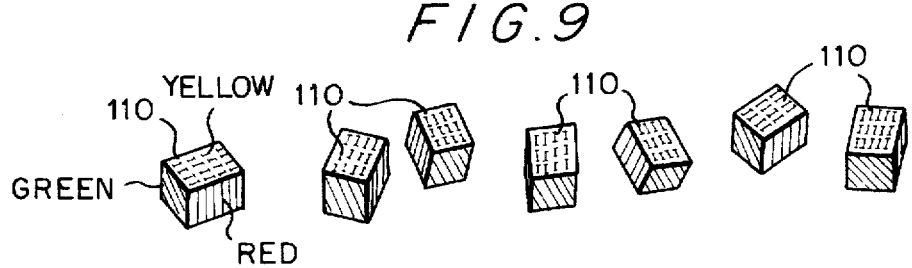
FIG. 10
| CIRCLES | A | B | C |
|---|---|---|---|
| USE EXPONENTS | $3 \cdot 2^2$ | $2^2$ | $2 \cdot 5$ |
| MULTIPLY | 3 x 2 x 2 | 2 x 2 | 2 x 5 |
| PRODUCT | 12 | 4 | 10 |
| OUTPUT | 0 | 0 | +1 |

| INPUT | PRIME FACTORIZATION | ALGEBRA FORM | OUTPUT |
|---|---|---|---|
| 12 | $2 \times 2 \times 3 = (2^2)(3)$ | $a^2 b$ | 0 |
| 30 | $2 \times 5 \times 3 = (2)(5)(3)$ | $abc$ | -1 |
| 21 | $7 \times 3 = (7)(3)$ | $ab$ | +1 |
| 18 | $3 \times 3 \times 2 = (3^2)(2)$ | $a^2 b$ | 0 |
| 19 | $19 = 19$ | $a$ | -1 |
| 210 | $2 \times 5 \times 3 \times 7 = (2)(5)(3)(7)$ | $abcd$ | +1 |
| 32 | $2 \times 2 \times 2 \times 2 \times 2 = 2^5$ | $a^5$ | 0 |
| 9 | $3 \times 3 = 3^2$ | $a^2$ | 0 |
| 51 | $3 \times 17 = (3)(17)$ | $ab$ | +1 |

| CIRCLES | A | B | C |
|---|---|---|---|
| PRIMES | 2·3·5 | $2^2$ | 2·3 |
| PRODUCT | 2 × 3 × 5 | 2 × 2 | 2 × 3 |
| INPUT | 30 | 4 | 6 |
| OUTPUT | -1 | 0 | +1 |

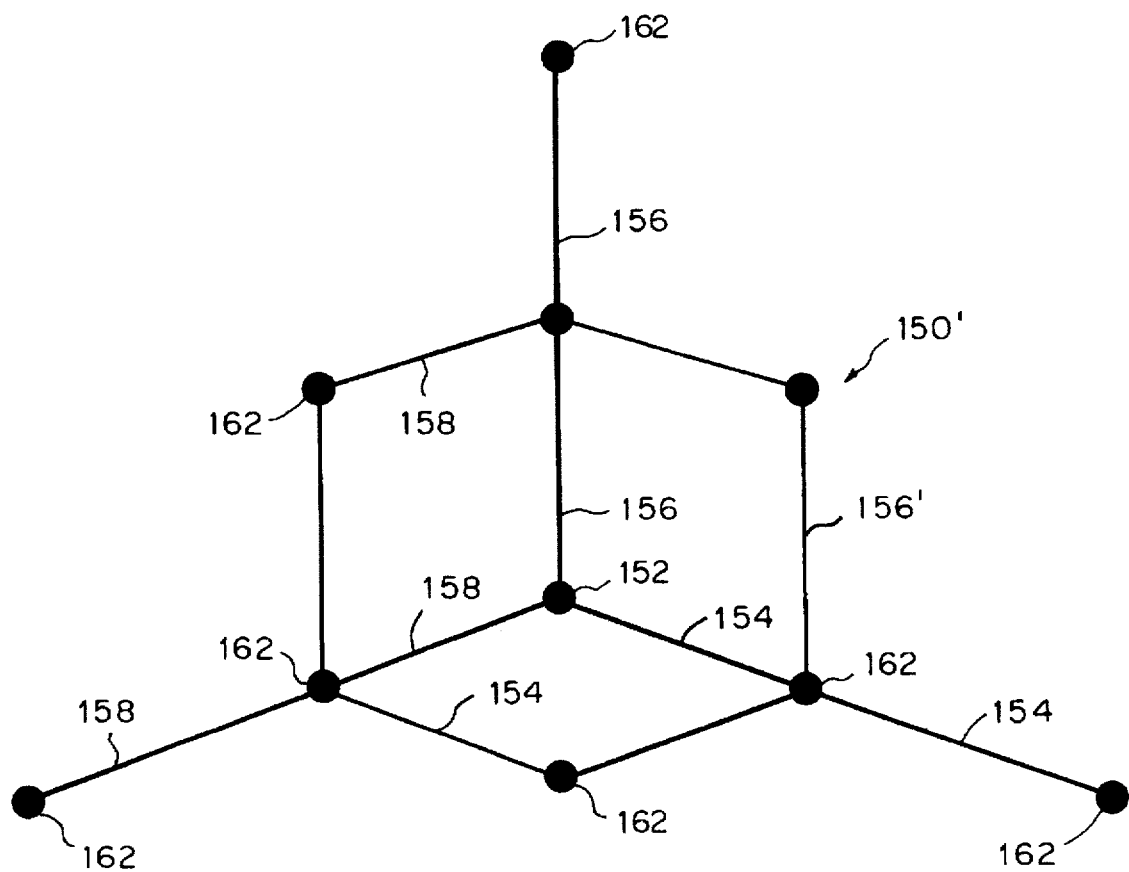
F I G. 16

| CIRCLES | A | B | C |
|---|---|---|---|
| PRIMES | 5 | 3 | 2 |
| PRODUCT | 5 | 3 | 2 |
| INPUT | 5 | 3 | 2 |
| OUTPUT | -1 | -1 | -1 |

| CIRCLES | A | B | C |
|---|---|---|---|
| PRIMES | 5 · 2 | 2 · 3 | 3 · 5 |
| PRODUCT | 5 x 2 | 2 x 3 | 3 x 5 |
| INPUT | 10 | 6 | 15 |
| OUTPUT | +1 | +1 | +1 |

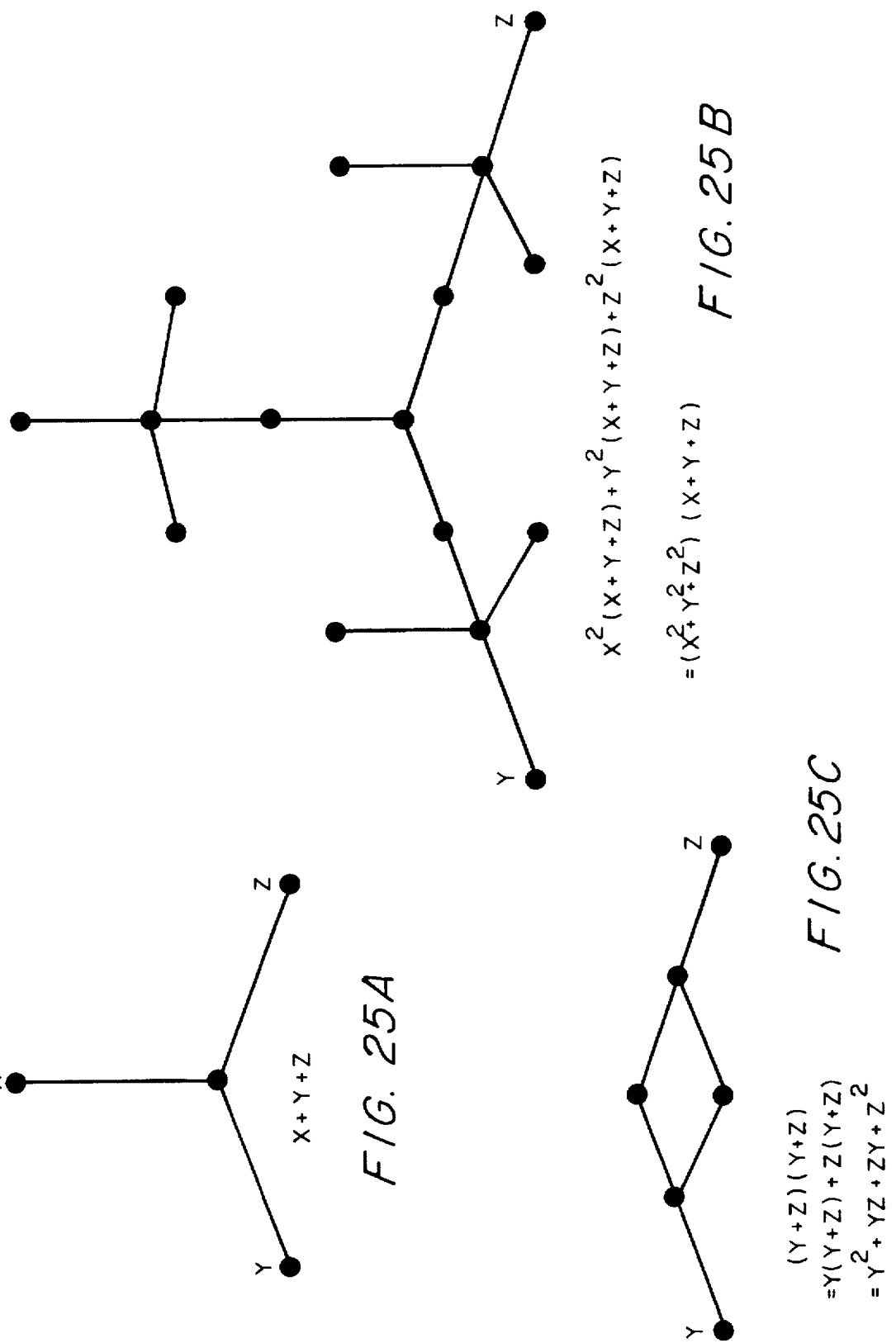

| VALUE (COLOR ROLLED ON A DIE) | FREQUENCY (NUMBER OF TIMES COLOR IS ROLLED) | RELATIVE FREQUENCIES (Rf) (RATIO OF NUMBER OF TIMES A COLOR IS ROLLED TO THE NUMBER OF ROLLS) |
|---|---|---|

| VALUE | FREQUENCY | Rf: COMMON FRACTIONS | Rf: DECIMAL FRACTIONS | Rf: PERCENTS |
|---|---|---|---|---|
| x | | | | |
| y | | | | |
| z | | | | |
| TOTALS: | | | | |

FIG. 34

TEAM A       STUDENT:

| TEAM MEMBERS OF TEAM A | COLOR ROLLED ON A DIE | VARIABLE ASSIGNED | JUDGE'S DECISION SFW OR DFW |
|---|---|---|---|
| | | | |
| | | | |
| | | | |
| | | | |
| | | | |
| | | | |
| | | | |
| | | | |
| | | | |
| | | | |
| | | | |

FIG. 35

| KEY | |
|---|---|
| COLOR | VARIABLE |
| RED | |
| BLUE | |
| YELLOW | |

| BINARY CODE FOR ASSIGNING NUMBERS TO SFW AND DFW | | | |
|---|---|---|---|
| COLOR ROLLED | VARIABLE ASSIGNED | FLAGWAY CLICKED | NUMBER |
| 1 | 1 | 1 | 7 |
| 1 | 0 | 0 | 4 |
| 1 | 0 | 1 | 5 |
| 1 | 1 | 0 | 6 |

METHODS OF PLAYING GAMES WHICH ENHANCE MATHEMATICAL UNDERSTANDING

CROSS-REFERENCE TO RELATED APPLICATION

This application is a continuation-in-part application of Ser. No. 08/371,074, filed Jan. 10, 1995 now U.S. Pat. No. 5,520,542.

FIELD OF THE INVENTION

The present invention is directed to methods of playing games which enhance mathematical understanding. More particularly, the present invention is directed to methods of playing games for enhancing mathematical understanding which games are particularly useful in teaching students concepts necessary for understanding algebra.

BACKGROUND OF THE INVENTION

Classical algebra is a generalization of arithmetic in which symbols are utilized for unknown numbers. The principles of classical algebra were synthesized in the 9th Century A.D. from earlier understandings by Abu Jáfar Muhammad ibn Músa Al-Khwarizm. Algebra spread subsequently from Northwest Africa to what is now Spain, from Spain throughout Europe, and from Europe to substantially the entire world.

Algebra and its derivatives are mathematical languages which are now almost universally utilized to explain and understand the philosophies underlying science and engineering. While there are notable exceptions, engineers and scientists, whether those scientists are physical scientists or social scientists, quantify the phenomena with which they are concerned so as to provide some common ground allegedly understood by at least those who appreciate the language of mathematics. In the modern world, a person may have a magnificent mechanical aptitude or an innate understanding of economics, politics, and sociology; but, without an understanding and appreciation of algebra, massive quantities of information are simply unavailable to that person. Worse still for everyone, that person is quite likely to be ignored.

In order to widen the participation of people in a modern society, it is necessary for as many people as possible to have an understanding and appreciation of quantitative concepts. After a person has acquired some facility with arithmetic, the next level is algebra. Algebra is used as a vehicle to understand not only chemistry, physics, engineering and economics, but also music, biology, sociology and even politics. In politics, for example, a voter who is interested in the election of only one candidate, and who has some familiarity with algebra, can more readily appreciate that on a ballot having five candidates on which the voter is allowed to vote for three, only one vote should be cast, since a vote for the two other candidates might diminish the chances of that voter's candidate prevailing. A child who might aspire to being a chemist, physician, engineer or corporate executive, has his or her chances severely comprised if that child does not understand algebra, since without an understanding of algebra, it is highly unusual for a student to succeed in trigonometry or calculus. In our society, algebra is a gate which must be opened in order to understand the language in which many other concepts are taught; and it is generally agreed that the more people who traverse the algebraic gate, the more knowledgeable a society, in general, becomes.

It is believed by many who have studied the subject that current methods of teaching algebra to children, as well as to adults, are counter-intuitive and defy common sense. Accordingly, many people are of the opinion that it is not in their best interest to learn algebra even though in the general scheme of things, people who understand algebra, or who have understood algebra, appear as a group to be better off than those who do not understand algebra. For the most part, it appears that those who do understand algebra would like to keep it that way, which is only natural. Some think that restricting access to such knowledge is counter-productive and would like as many people as possible to understand the language of algebra. They have undertaken activities such as the ALGEBRA PROJECT™ in order to include as many people as possible in the circle of those who understand and appreciate algebra.

In teaching algebra, a difficulty appears to arise when a student attempts to make the transition from arithmetic to algebra. To facilitate this transition, a discipline known as "pre-algebra" has arisen. It is the opinion of some people that pre-algebra is more difficult to teach and progress in than actual algebra because pre-algebra requires an understanding of numbers which is not readily apparent from the exercises that one undertakes to understand and appreciate arithmetic. Accordingly, there is a need for vehicles that convey these understandings and thereafter smoothly merge these understandings with classical algebra while providing insight into more sophisticated concepts.

SUMMARY OF THE INVENTION

It is a feature of this invention to provide new and improved methods of playing games for teaching mathematical concepts and skills.

The present invention is directed to a series of games for teaching mathematical concepts and skills. In practicing the methods, first embodiments of the games utilize a lattice which includes legs configured in lattice arrays extending from a central point. Each lattice array includes three legs, and each lattice array extends from a terminus of another lattice array to a terminal point. A plurality of number chips having numbers thereon for factoring by the players are supplied, as well as input/output tables, each having an area for recording the prime factors of the numbers on the number chips and an area for providing an output value in accordance with selected rules. The output values define a path on the lattice. A frequency table is provided for receiving the numbered chips. The frequency table is an arrangement for sorting the number chips in accordance with the output values of the numbers on the number chips.

In accordance with one aspect of the invention, the output values are defined by the indicia "−1", "0" and "+1", which indicia "−1", "0" and "+1" are associated with each leg of the lattice.

In accordance with another aspect of the invention, a Venn diagram puzzle is included with a plurality of Venn diagram chips, each identifying a different color. Dice having colors associated with the chips are cast in order to provide prime numbers which are strategically placed in the Venn diagram puzzle until it is filled with the Venn diagram chips. The input/output tables are used to identify paths from the center point of the lattice to the terminal points of the lattice.

In accordance with still further aspects of the invention, the lattice is a two-dimensional lattice; and, in accordance with yet a further aspect of the invention, the lattice is three dimensional. Both two- and three-dimensional lattices include a series of "routes" defined by the legs of the lattice.

The two-dimensional lattices have a series of "routes" having 3, 9, 27, 81, 243 ... routes per lattice. Corresponding to each of these lattices is a three-dimensional lattice. The three-dimensional lattices provide a structure for exploring both binomial and trinomial expansions using games of chance that involve statistics and probability, thereby merging in an algebraic framework a number of mathematical concepts.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views and wherein:

FIG. 4 are input/output tables also referred to as "output flags";

FIG. 7 is a lattice route chart;

FIG. 8 is a Venn Diagram puzzle;

FIG. 9 are dice used in conjunction with the Venn diagram of FIG. 8;

FIG. 10 is a chart for recording the results of casting the dice of FIG. 9 and the results assigning values accordingly to the Venn diagram chips of FIG. 8;

FIG. 16 is a view of a three-dimensional lattice having three levels instead of four levels as is the case with the lattice of FIG. 12;

FIG. 25A–25J are prospective views of various lattice structures with algebraic expressions which correspond to those structures;

FIG. 33 is a frequency distribution table which may appear on the monitor screen of a computer used to play the game of the present invention;

FIG. 34 is a name table which may appear on a computer monitor and is used to play the game of the present invention;

FIG. 35 is a table coordinating colors of the die of FIG. 32 and variables;

DETAILED DESCRIPTION

Figure 1:
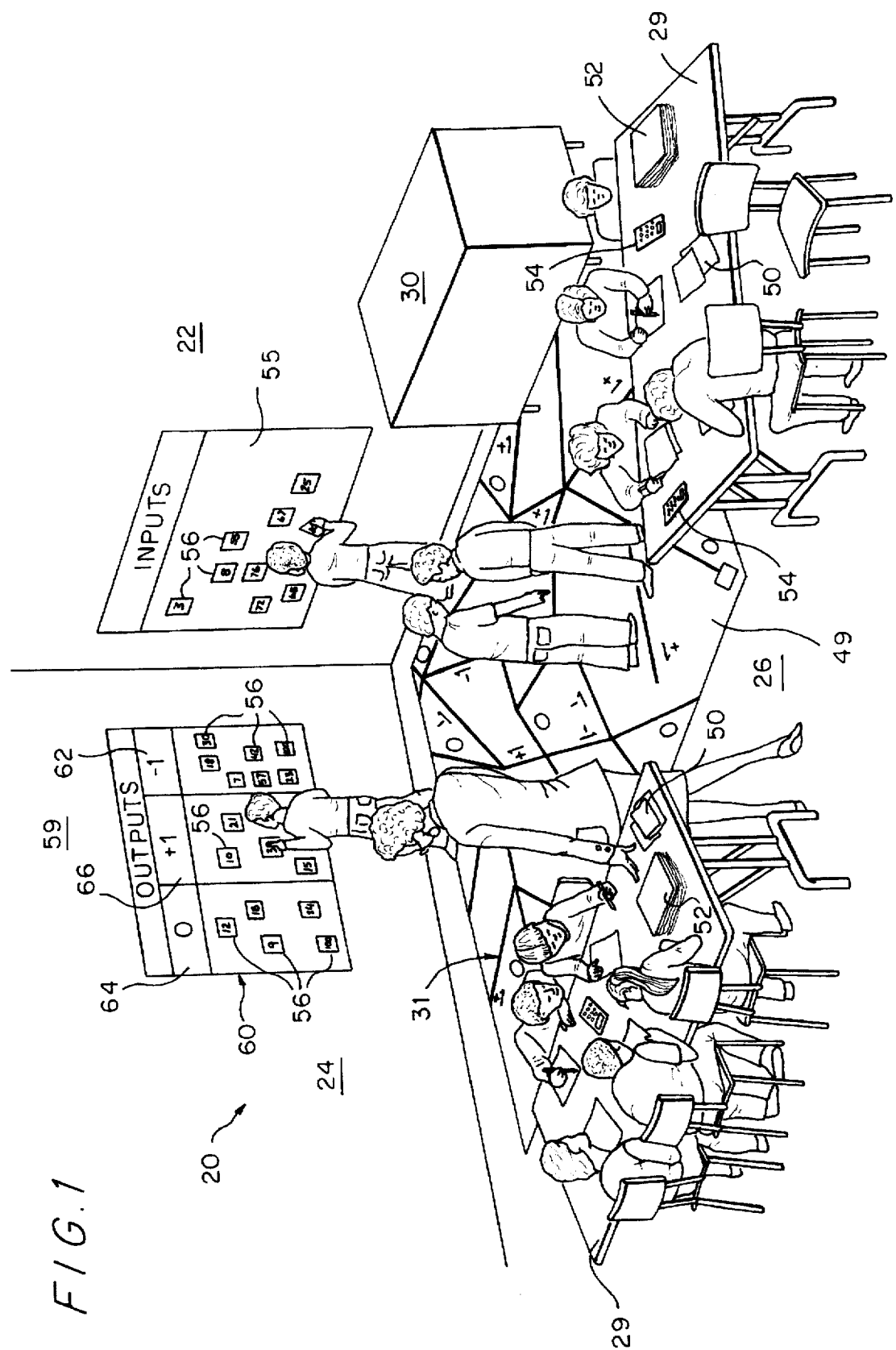
FIG. 1 is a perspective view of a classroom in which the game in accordance with the present invention is played.

Referring now to FIG. 1, there is shown a classroom 20 which provides a space for playing the game in accordance with the principles of the present invention. The present invention involves moving students around in a room as they play the game so that they may physically experience the concepts involved in the game. The classroom 20 includes at least a first wall 22 and a second wall 24, as well as a floor 26. The classroom also includes areas 28 with desks or tables 29 where students, who may be organized in teams, congregate when playing the game and a station 30 where a teacher who serves as a judge and referee sits. The game may be played by a few students or relatively large numbers of students and to date has been played by up to one hundred fifty people simultaneously, including students' parents. The upper limits as to the numbers of participants in this game have yet to be established; however, it is envisioned that through computer networks, the game could be played simultaneously by thousands of people. Since the game appears capable of generating excessive enthusiasm, the number of people gathered to participate at a single location should perhaps be limited.

Returning now to the single classroom 20 of FIG. 1, the location of various elements around the classroom requires that the students move around the classroom as they play the game and thus encourages them to remain conscious as they participate. Since the game requires team conferences, consultations and decisions, the atmosphere inside the room 20 frequently resembles the floor of a commodity exchange rather than the atmosphere of the traditional staid classroom.

Figure 2:
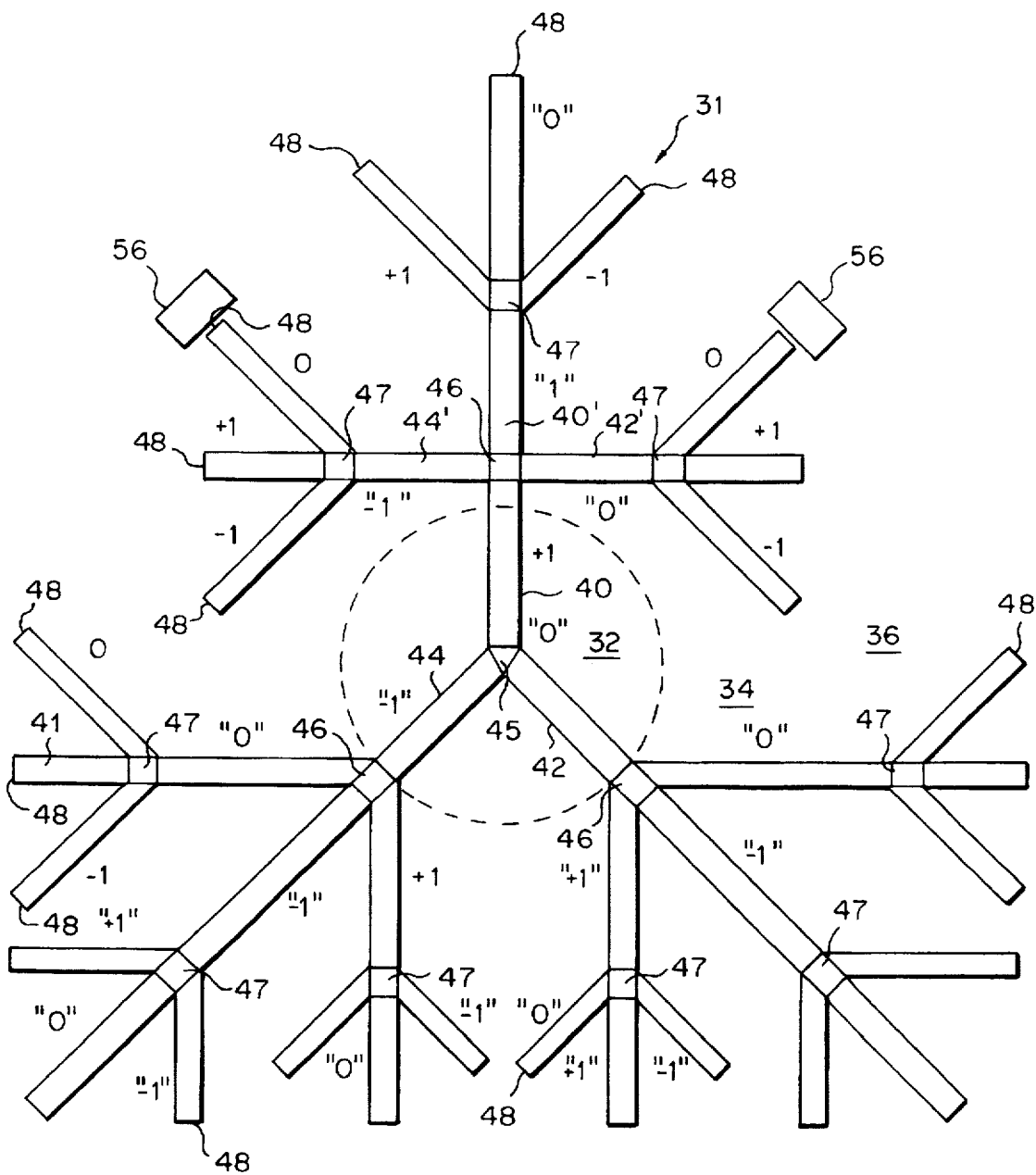
FIG. 2 is a plan view of a lattice known as a FLAG-WAY™ which, in accordance with one embodiment of the present invention, is placed on the floor of the classroom illustrated in FIG. 1 and duplicates of which are distributed to students as worksheets.
Figure 3:
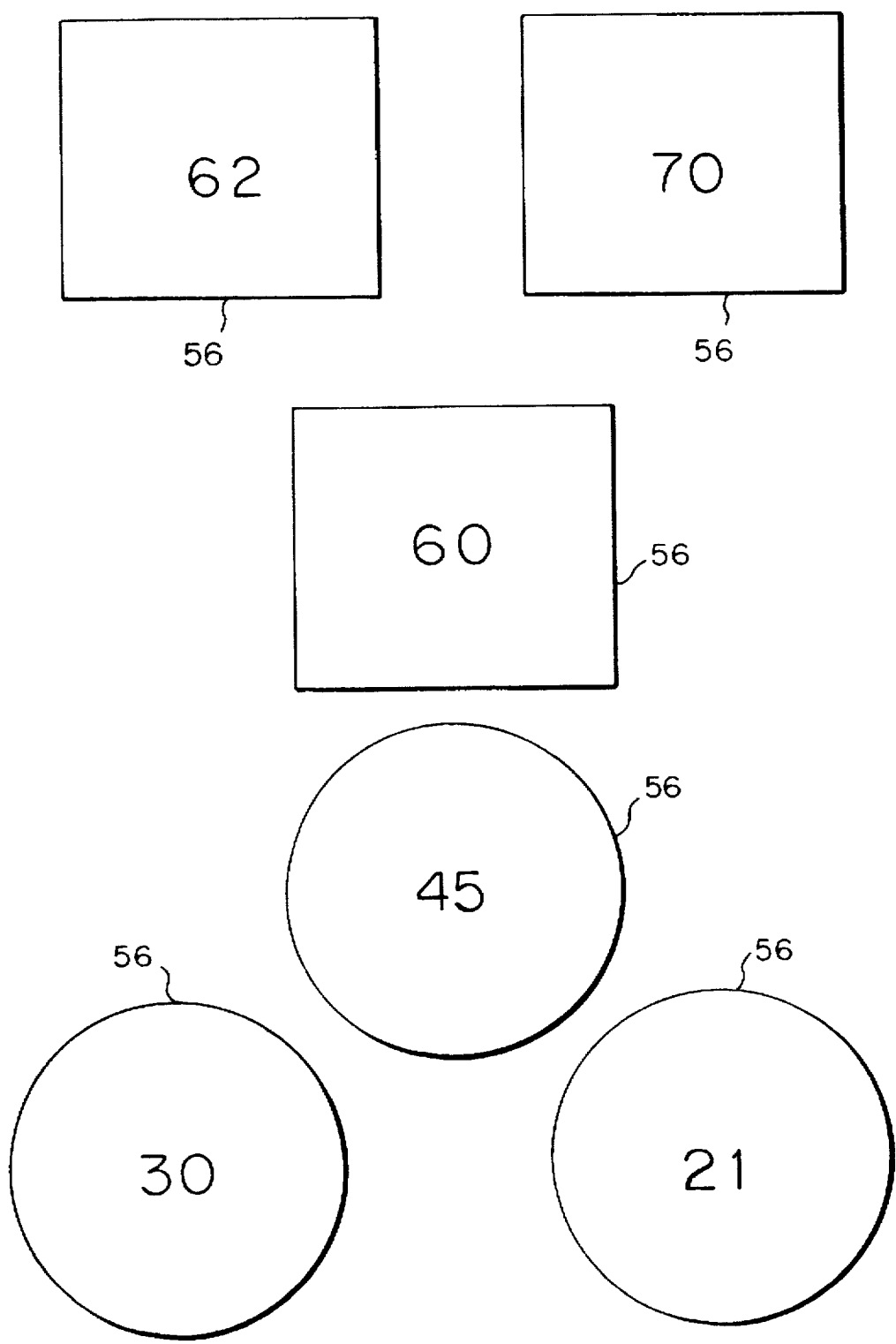
FIG. 3 is a view showing a plurality of POST-ITS® with numbers thereon referred to as number chips.

Referring now to FIG. 2, there is shown a two-dimensional, multi-colored lattice 31 comprised of first, second and third zones 32, 34, and 36. In the zone 32, there are three legs 40, 42, and 44 radiating from a starting point 45. The leg 40 is identified with output "+1", the leg 42 is identified with the output "0", and the leg 44 is identified with the output "−1". The legs 40, 42, and 44 in the area 32 are each green in color. In the next area 34, there are three legs which project from nodes 46 at the end of the legs 40, 42 and 44. The outputs "+1", "0", and "−1" are repeated in the area 34 for the legs 40', 42' and 44'. There are three times as many legs 40', 42' and 44' as there are legs 40, 42 and 44. All of the legs 40', 42' and 44' are yellow in color. Finally, at nodes 47, legs 40', 42' and 44' branch again each into three legs 40" representing the output "+1", 42" representing the output "0" and 44" representing the output "−1". There are three times as many legs 40", 42" and 44" in the area 36, and these legs are all red in color. Accordingly, in area 32, there are three legs; in area 34, three is squared so that there are nine legs; and, in area 36, there are 3×3×3 or 27 legs, i.e., $3^3$. At the end of the legs 40", 42" and 44", there are terminal points 48.

The lattice 31 of FIG. 2 is instructional in and of itself in that it resembles a number of things such as the branches or root system of a tree, the structure of a snowflake or perhaps another crystal, a flow of information, as well as a myriad of other phenomenon. In order to enhance its significance to the student, the lattice 31 is placed on the floor 24 of the classroom in the form of a rolled-out mat 49. Each student playing the game is provided with an uncolored replica of the lattice 31 on a worksheet paper. The student then colors the legs 40–44" on the replica to resemble the color scheme of the lattice 31 on the mat 49 placed on the floor 24 of the classroom 20.

FIRST EMBODIMENT OF THE INVENTION

(First Version)

Each student receives a green, yellow and red magic marker to color the replica of the lattice 31 of FIG. 2 at the student's desk. On scratch paper, students practice factoring using the factor tree method wherein a number is selected and oblique lines are drawn from that number to the factors of the number. For example, if the number is "60", then a first pair of lines is drawn to the numbers "2" and "30." Since "2" is a prime number, it cannot be further factored, but the number "30" can be further factored and is factored into "2" and "15." The number "15", is factored again into the numbers "3" and "5", both of which are prime numbers. Students practice until they have a reasonable understanding of the arithmetic concept of prime numbers. There is a finality to factoring a number into its prime factors, which finality apparently gives people pleasure, as well as motivation, to attach further significance to the prime numbers they have uncovered.

Referring again briefly to FIG. 1, it is seen that each student has at his or her desk a plurality of input/output tables 50 (see FIG. 4), a score sheet 52 (see FIG. 6), an optional calculator 54, and a replica of the lattice 31 (see FIG. 2). At one location 55, on the wall 22 of the classroom 20, number chips 56 are adhered. Each number chip 56 is on a POST-IT® and has a separate number thereon. There may be, for example, numbers from "1" to "99." If desired, larger numbers may also be used; but, for pre-algebra students, numbers "1" to "99" are probably preferable. The numbers may be arranged in any order or may be randomly affixed in the location 55.

Figures 5, 6:
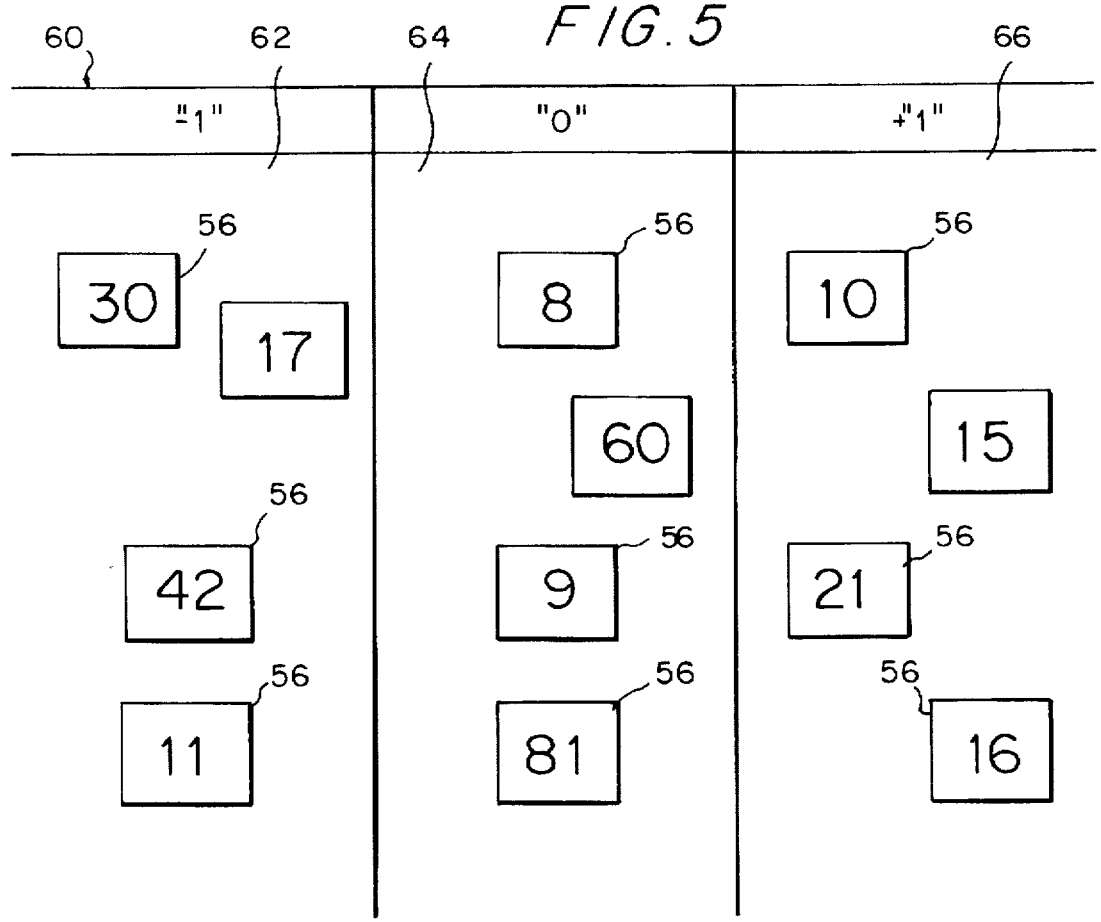
FIG. 5 is a frequency table for retiring the number chips of FIG. 3 after the number chips have been processed by a student using the input/output tables of FIG. 4.
FIG. 6 is a score sheet used to score games which are played in accordance with the structures set forth in FIGS. 1 through 5.

Located at a separate location 59 on wall 24 of the classroom 20 is a frequency table 60 for retiring the number chips 56 after the numbers on the number chips have been processed by playing the game. As is seen in FIG. 5, the frequency table 60 has a first column 62, which is given the output value "−1"; a second column 64, which is given the output value "0"; and a third column 66, which is given the output value "+1".

Considering the game in general, the game is played in teams, and the object of the game is to correctly place as many input/output tables 50 as possible on the lattice 31. Another object is to correctly place as many number chips 56 correctly in the columns 62, 64, and 66 of the frequency table 60. Preferably, 20 to 25 people play on one lattice 31 with 4 to 5 players per team. To initiate the game, players select three number chips 56 and fill out a single input/output table 50. One input/output table 50 at a time is presented for the judge at table 30 to review. The judge checks the input/output table 50 to see if it is filled out correctly, and, if it is not filled out correctly, the player returns to the team area to make corrections. Any team member may help with the corrections. Once the correction is properly made, the player writes the input number from the number chip 56 in the input column of the flag score sheet 52 (see FIG. 6) and the output value "−1", "0", or "+1" in the output column of the score sheet. Preferably, the teacher or judge at table 30 does not help the student make a correction but rather merely identifies the error. The student relies on team members to make the correction. If the "correction" is incorrect, the entire team assumes the blame so that no individual student is shamed.

Considering the game now in more detail, to initiate the game, the teacher utters some remark such as "GO!", and the students rush to the area 55 to select three number chips 56. The students then return to their desks 29, turn over single input/output tables 50 and factor the numbers on the number chip 56 using the factor tree method for each number chip selected. As is seen in FIG. 4, the input/output tables 50 are divided into an input column 70, a prime factors column 72, and an output column 74.

As is seen in FIG. 4, the numbers on the number chips 56 are placed in the input column 70. In the illustrated example, the numbers selected are the numbers "30", "15", and "8." These numbers may, of course, be any of the numbers on the number chips 56 selected. In the next column 72, the prime factors of these numbers, as determined by the students' number tree on the back of the input/output tables 50, are recorded. For example, the prime factors of the number of "30" are the numbers "3", "2", and "5." The prime factors of the number 15 are the numbers "3" and "5." The prime factors of the number "8" are the numbers "2", "2" and "2." According to the rules of the game, the output listed in the output column 74 is determined by a selected property of the prime factors. If the prime factors are "odd" in number, the output will be "−1". If the prime factors are "even" in number, then the output is "+1". If there are duplicate prime factors, indicating that a number has been raised to a power, then the output is "0". These assigned properties of prime factors are prescribed by the rules of the game to familiarize the students with the concept of negative and positive direction.

After filling out the input/output table 50, the student checks with the teacher or judge at desk 30, who determines if the prime factoring and output numbers have been correctly placed on the input/output table. If not, the teacher returns the student to the team, and the team reviews the mistake. The judge merely says whether the factoring has been done correctly, and the students correct the mistake. One student on each team then takes the corrected input/output table 50 and walks the output on the lattice 31 (located on mat 49 on floor 26) utilizing the outputs "−1", "+1", and "0" as directional instructions. The input/output table 50 is then placed like a "flag" at one of the terminal points 48 on the lattice 31. In accordance with the present practice of the invention, the input/output tables 50 are adhered with tape adjacent the appropriate terminal points 48.

The student then takes the number chips 56 and places or "retires" them in the frequency table 60 on the wall 24 in accordance with the output associated with that number. As is seen in FIG. 5, the number chip 56 having the output number "30" would be retired in column 62 of the frequency table 60 because it has an output value of "−1." The number chip 56 having the input number "15" is retired in column 66 of the frequency table 60 because it has an output value of "+1 ." The number chip 56 having the input number "8" is retired in the output column 74 because it has a output value of "0".

It is emphasized that two slips of paper or "flags" are placed in the frequency table by each student during each "round" of the game, the first being the input/output table 50 adhered (temporarily) to the end points 48 of the lattice 31 on mat 49 and the number chips 56 adhered (temporarily) to the frequency table 60 on the wall 24. POST-IT® paper slips are a preferred, readily available, and inexpensive form for the number chips, The game is played either for a time limit or continuously until all of the number chips 56 are depleted from the area 55 on wall 22 and deposited on the frequency table 60 located on wall 24. At that time, it is clear to the students that the game is over because there are no more number chips 56 in the area 55 because the numbers have been sorted by the students and organized in accordance with the rules of the game in the frequency table 60. The students then realize that even though numbers may be different, the numbers have at least one identical property that has been identified by processing the numbers in accordance with the rules of the game.

The students then fill in the score sheets 52. A suggested method of scoring is to provide 10 points for each input/output table filled out correctly, 10 points for each input/output table 50 which has been placed correctly at a terminal point 48 of the lattice 31 located on the floor 26, and 10 points for correctly placing a number chip 56 in the proper column 62, 64, or 66 of the frequency table. In order to facilitate scoring and to assign responsibility, the student signs each number chip 56 and input/output table 55 with his or her name and the team's name.

FIRST EMBODIMENT OF THE INVENTION (Second Version)

In the first version, the students play the game with the teams organized as groups in which all team members participate simultaneously. In the second version, the game is played as a relay race wherein each team has four or six players. In this version, a pair of students select their number chips 56, fill out their input/output tables 50, walk the lattice 31 on the floor 26, place the input/output tables 50 at terminal points 48 of the lattice, and then retire their number chips in the frequency table 60. As each pair of players finishes these tasks, they return to their team to release two more players. The game continues until all of the number chips 56 have been removed from the area 55 and retired to the frequency table 60. As in any relay race, the team which finishes first wins, first in this case meaning the most correct answers.

SECOND EMBODIMENT OF THE INVENTION

In the first embodiment of the invention, players are given input numbers 56 and are asked to find their outputs "−1", "0", "+1" (see Chart 60). Because the rule for assigning outputs is based on prime factorization, and prime factorization is unique, each input number is assigned a unique output.

In the second embodiment of the invention, players are given a "route" on the lattice 31 to capture. This means players have to find the input numbers 56 which have the outputs "−1", "0", or "+1" of the "route" they want to capture.

SECOND EMBODIMENT OF THE INVENTION (First Version)

Two or more teams compete on the same lattice 31 to capture as many "routes" as they can. The twenty-seven different "routes" are listed on the lattice 31 chart of FIG. 7, on which teams sign off when a judge has approved a route capture of theirs or one of the team's route captures. (See the lattice 31 of FIG. 2 which serves as a route chart.) At this level, students are not given any help in finding input numbers 56 which have a certain output "−1", "0", or "+1". One method students use to find an input number 56 that has a specific output "−1", "0", or "+1" is to "guess and check". Students factor their "guess" to see if it gives the needed output.

SECOND EMBODIMENT OF THE INVENTION (Second Version)

The second version of the second embodiment is similar to the first version but this time no input number 56 may be used more than three (or two) times. In this version, posted input numbers 56 are retired with the capturing of a "route". As it becomes more difficult to find "input numbers" with the desired output, the "guess and check" method becomes less efficient. Some students discover that they can work with prime numbers to "construct and multiply" rather than "guess and check". This leads to the third version of this embodiment of the invention.

SECOND EMBODIMENT OF THE INVENTION (Third Version)

The "construct and multiply" strategy involves the insight that strings of prime factors such as:

2,3,5

2,3,5,7

2,3,3

19 etc.

define output numbers: in order from top to bottom −1, +1, 0, −1. It is thus easier to work with prime factors to "construct" input numbers 56 which have the desired output "−1", "0", or "+1".

Because prime factorization is unique, each such list of prime factors produces a unique input number:

2×3×5=30

2×3×5×7=210

2×3×3=18

19=19 etc.

Clearly, the "construct and multiply" strategy is available to any player who has grasped this critical role of prime factors in the construction of numbers. To help students grasp this role, the color-coded Venn diagrams 111 of FIG. 8 and color coded dice 110 of FIG. 9 are used. Each teach has seven color coded dice 110 with three colors thereon. Since each die 110 has six faces, two faces are "black"; two faces are "blue" and two faces are "white". Each color is assigned a selected prime number by the teacher or judge 30 (FIG. 1). For example, black represents the number "2", blue represents the number "3", and white represents the number "5".

The Venn diagram puzzle 111 of FIG. 8 has seven colors. The yellow, green and red sectors 112, 114 and 116, respectively, are primary colors so that when they intersect one another by pairs, they produce the colors blue, purple and orange, identified by segments 118, 120 and 122. When all three primary colors intersect, they produce brown, which is identified by segment 124.

Now suppose a team rolls its seven dice and the colors lead to the prime numbers: 5, 5, 3, 3, 2, 2, 2. A team could use these to capture routes as shown in FIG. 10.

The dice 110 limit the prime factors available to the players, while the Venn diagrams 111 allow this fixed number of prime factors to be structured in various combinations to give the desired outputs. The idea of "common factors" is embedded in this activity, because a prime number becomes a factor of one, two or three input numbers according to its placement in the Venn diagram 111. The Venn diagram 111 helps to picture common factors through the color coding scheme described above.

This game can be played in a version in which two or more teams compete to capture "routes" on the same lattice 31, or teams work their own lattice.

THIRD EMBODIMENT OF THE INVENTION

Figures 11, 12:
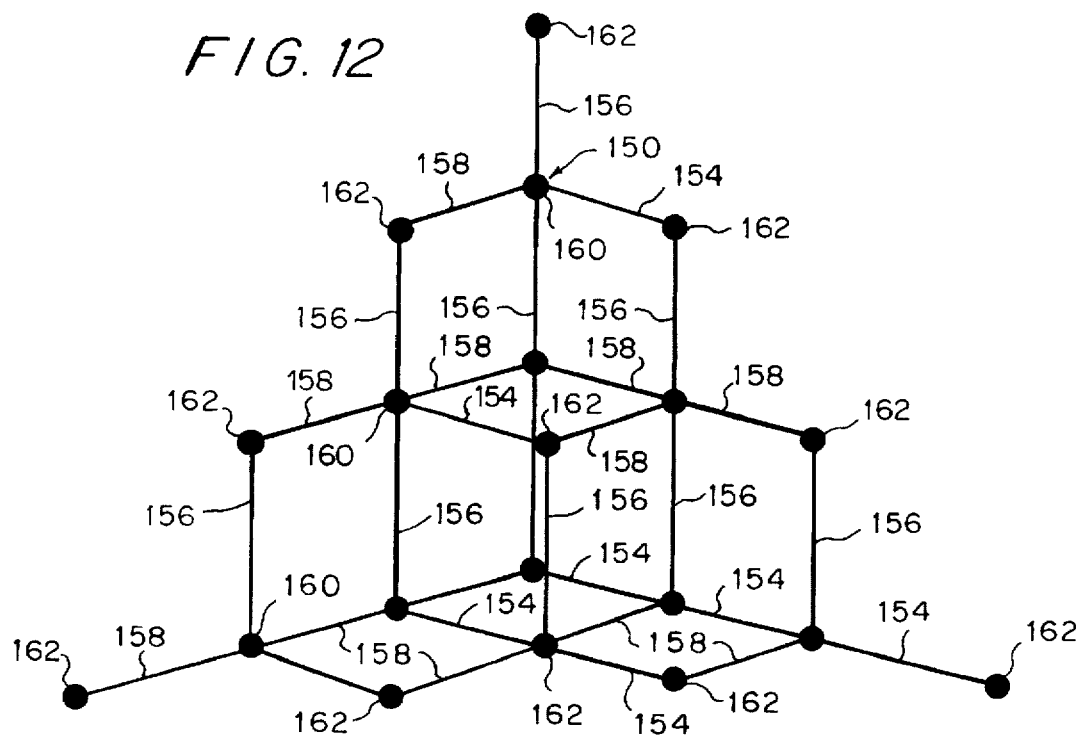
FIG. 11 is a chart illustration in which prime factorization of input numbers is used to construct an algebra form of that input.
FIG. 12 is a three-dimensional lattice.

For older students, all of the above versions of the first and second embodiments of the invention may be played with the following extension: the unique prime factorization of input numbers is used to construct an Algebra form of the input as is shown in FIG. 11.

In these versions of the game, students learn that it is the Algebra form of an input number that determines its output.

FOURTH EMBODIMENT OF THE INVENTION

Figures 13, 14:
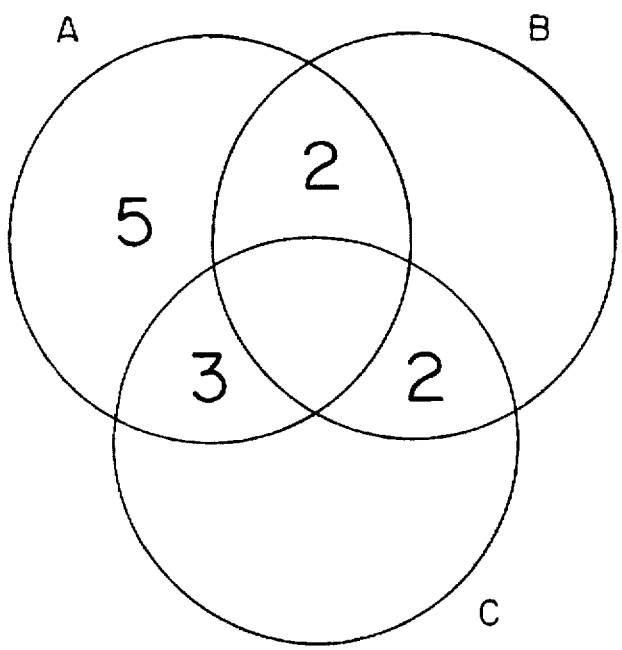
FIG. 13 is a "powers of three" table coordinated with colors used in the first embodiment of the present invention.
FIG. 14 is a chart illustrating nine pair of "directions" corresponding to two colors, with two numbers and nine routes on the lattice of FIG. 2.

Referring now to FIG. 12, the three-dimensional lattice 150 has a structural correspondence to the two-dimensional lattice 31 of FIG. 2. This correspondence may be seen more clearly by considering extensions of the two-dimensional lattice and the corresponding three-dimensional lattice 150. The natural extensions of the two-dimensional lattice 31 are given in FIG. 13. Reading from top to bottom, each additional color defines a different two-dimensional lattice 31. As a color is added, an additional input number is added. Thus, the various embodiments of the invention described above could be played on the minimum two-dimensional lattice 31. One color, green, one input number, three routes given by the three "directions": 0, +1, −1 which are the three outputs. Next would be the two colors green and yellow with two input numbers and nine routes given by nine pairs of "directions", as is seen in FIG. 14.

Next comes the configuration which has been the model up to now: three colors: green, yellow and red, with three input numbers and 27 triplets of "directions" of the lattice 31. If we have four colors, we use four input numbers which generate 81 four-triples of "directions". Then five colors use 5 input numbers which generate 243 give-triples of "directions". It is clear then that the colors in the two-dimensional structure track on lattice 31 track the number of inputs as well as the n-triples of the "directions" for routes.

On the three-dimensional lattice of FIG. 12, this information is not coded by color but by levels. Thus, the three-dimensional lattice 150 shown in FIG. 12 has four levels as shown in the FIG. 15. If we used only two colors, we would have three-dimensional lattices 150', as in FIG. 10'. This would have three levels as in FIG. 17. The numbers in the circles (to be explained below) add up to 9=$3^2$, just as, in FIG. 15, the numbers in the circles add up to 27=$3^3$.

Figure 18:
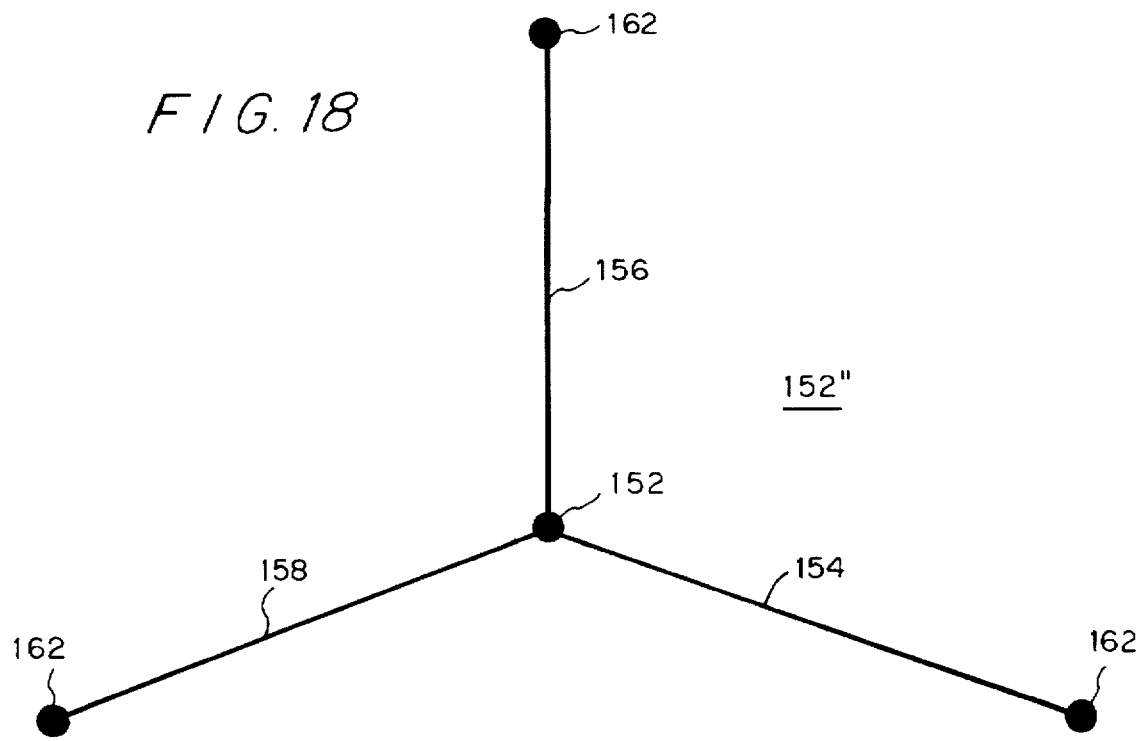
FIG. 18 is a view of a three-dimensional lattice having two levels.

If we used only one color, we would have a three-dimensional lattice 150" as in FIG. 18. This would have two levels, as in FIG. 19. The numbers now add up to 3=$3^1$.

Figure 19:
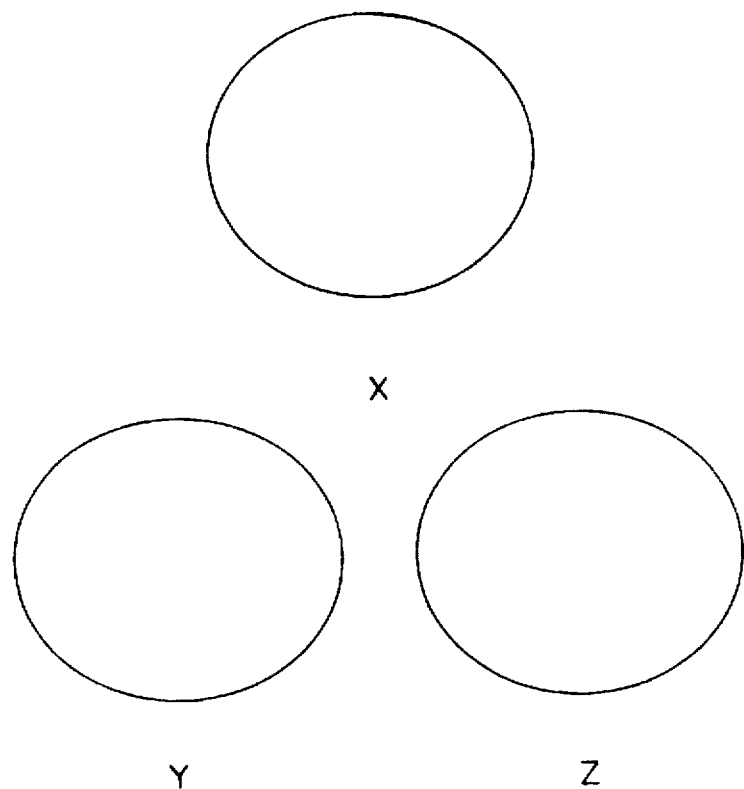
FIG. 19 is a trinomial tally table for the lattice of FIG. 18.

If we used four colors, then the three-dimensional lattice would add another tier, and we would have five levels. In the "Algebra" associated with the three-dimensional lattices 150, 150', and 150", the exponents in the trinomials keep track of the colors and associated number of inputs:

$(x+y+z)^1$<->two levels $(x+y+z)^2$<->three levels $(x+y+z)^3$<->four levels $(x+y+z)^4$<->five levels Level one, shown in FIGS. 18 and 19, for which there can be no game, would be $(x+y+z)^0=1$. The color coding on the three-dimensional lattice keeps track of the three outputs or "directions". This three-dimensional lattice 150 is comprised of an initial node 152, with parallel X direction legs 154, each of which is the same color, e.g., black; parallel Y direction legs 156, each of which is the same color, e.g., blue, and parallel Z direction legs 158, each of which is the same color, e.g., white. The legs 154, 156 and 158 are connected to one another by nodes 160 and end in terminal points 162. Thus, in the there dimensional lattice 150, the colors track the x, y, z directions (which are all one-way) which in turn track the outputs 0, +1, −1 which are the direction indices of the two-dimensional Flagway.

| Color | Letter | Output |
| --- | --- | --- |
| Black | X | 0 |
| Blue | Y | +1 |
| White | Z | −1 |

First Version

The object of this game is to help students to understand how the three-dimensional structure relates to the two-dimensional structure. Two or more teams play against one another. The 27 routes are placed in a "hat" and each team takes a turn at selecting a route and "walking" it on the there as well as the two-dimensional lattices 31. A "walk" on the three-dimensional lattices 150 and 150' begins at initial node 152. We find there the three x, y, z directions. The walk proceeds along one of the x, y, z directions to a node 160. At any such node, we find the same three x, y, z directions, and the walk resumes along any one of these to another node 160. Again, the same three x, y, z directions are present, and the walk resumes along any one of these to a terminal point 162. A flag is then placed at this terminal point. If it is correctly placed, the team wins points. The team that wins the most points for correctly placing flags on the two- and three-dimensional lattices 31 and 150 is the winner.

The three-dimensional lattice 150 is constructed so that the number of ways to "walk" to any terminal point 162 from the initial node 152 corresponds to the number of arrangements that are logically possible for the three outputs of that "walk".

For example, the outputs of three, two-dimensional routes:

(0, +1, 0);
(+1, 0, 0); and
(0, 0, +1)

represent all the ways of arranging two zeroes and a positive one on a route. On the two-dimensional lattice 31, each of the above routes goes to a different terminal point. On the three-dimensional lattice 150, the corresponding three walks are coded as:

| | | |
|---|---|---|
| x, y, x | or | black, blue, black |
| y, x, x | | blue, black, black |
| x, x, y | | black, black, blue | with each "walk" finishing at the same terminal point 162. In the "Algebra" of these "walks", this terminal point 162—in this case—represents the combination $X^2Y$, and the three ways to "walk" to this terminal point 162 represent the three permutations (arrangements) of the combination.

There are exactly three terminal points 162 that may be reached by "walking" in only one direction. These points correspond to the three routes of the two-dimensional lattice 31:

0, 0, 0,
+1, +1, +1
−1, −1, −1, and they represent the terminal points 162: $X^3$, $Y^3$, $Z^3$, respectively. Accordingly, in the expansion of $(x+y+z)^3$, the terms $1x^3$, $1y^3$, $1z^3$ occur. Analogous to the output routes that correspond with the three permutations of $x^2y$, there are output routes, in groups of three, that represent the permutations of the combinations: $x^2z$, $y^2z$, $xy^2$, $xz^2$, $yz^2$. Accordingly, the expansion of $(x+y+z)^3$ contains the terms: $3x^2y$, $3x^2z$, $3y^2z$, $3xy^2$, $3y^2z$, $3xz^2$ and $3yz^2$. Finally, there is just one remaining terminal point 162. It is located exactly in the center of the three-dimensional lattice 150. To "walk", using all three directions is required. There are exactly six ways to do this, the six permutations of the combination xyz:

xyz
xzy
yxz
yzx
zxy
zyx

Figure 15:
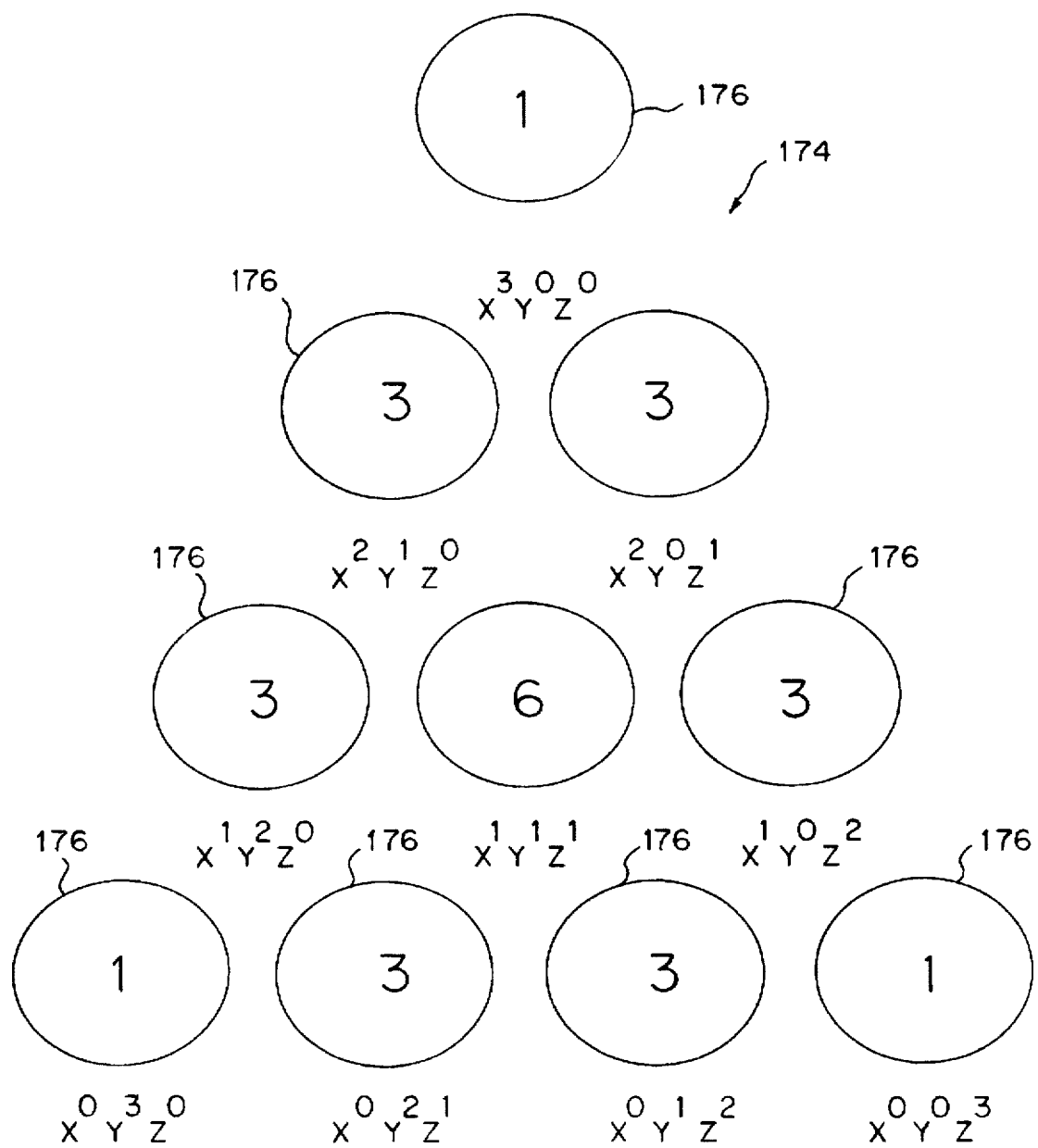
FIG. 15 is an illustration of a trinomial tally triangle showing the frequency distribution of XYZ combinations.
Figure 17:
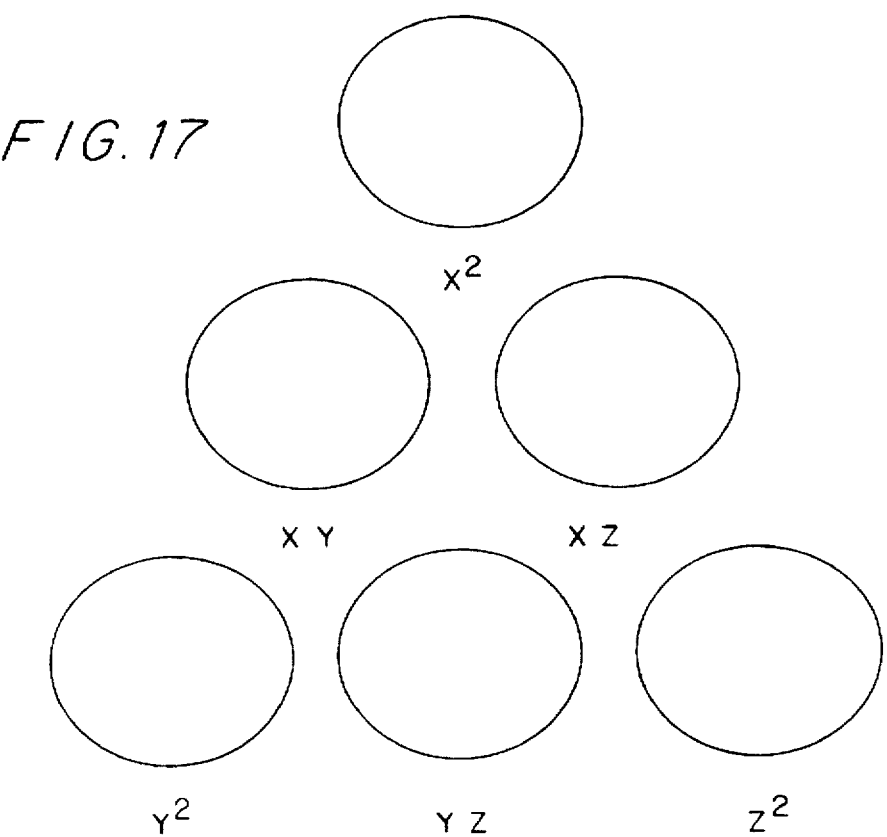
FIG. 17 is a trinomial tally table for the lattice of FIG. 16.

Accordingly, the expansion of $(x+y+z)^3$ contains the term 6xyz. All ten combinations are represented in FIG. 15. In this figure, the zero exponent means that the indicated direction was not chosen. Analogous combinations are represented in FIG. 17 and FIG. 19 without zero exponents.

This version of the game is finished when all the routes have been selected from the "hat" and worked on. The team which successfully completes the most "routes" and "walks" wins.

Second Version

There are many games of chance to play with the three-dimensional lattice. These games offer students arenas in which to explore statistics and probability in the context of trinomials.

Three dice color-coded black, blue and white, with opposite faces having the same color, are provided to each team. Each team rolls the dice and records the combination it rolls with a tally mark in the appropriate circle. The first team that rolls at least one tally mark in each of the circles brings the game to a close. In this version, the rolls should be public, and each team should tally every team's rolls. Judges keep their own tallies, and teams gain points by the accuracy of their tallies.

Third Versions

Figure 20:
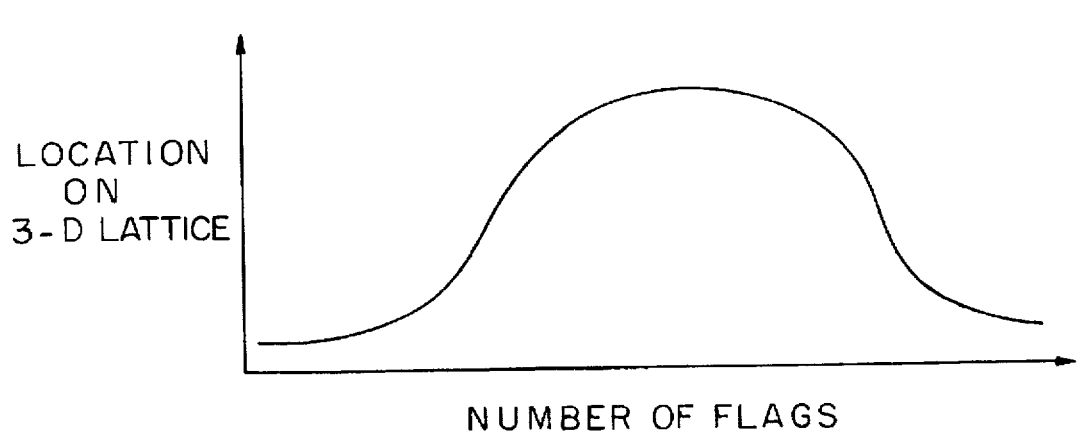
FIG. 20 is a standard distribution curve.
Figures 21, 22:
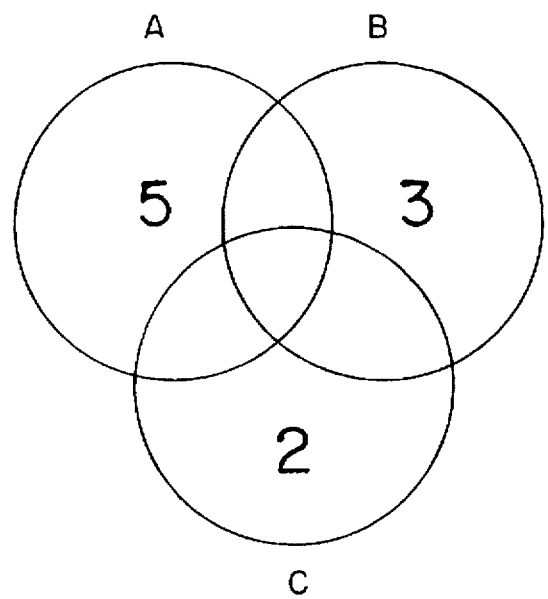
FIG. 21 is an illustration of a Venn diagram with assigned values for three circular areas.
FIG. 22 is an output chart for the Venn diagram of FIG. 21.
Figures 23, 24:
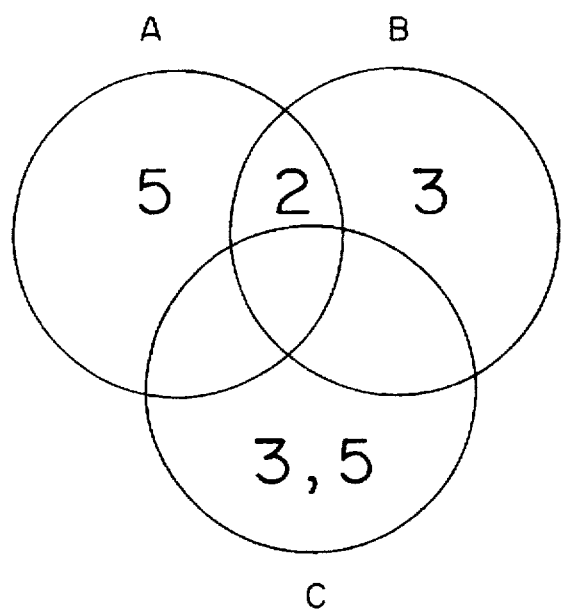
FIG. 23 is another embodiment of Venn diagram use.
FIG. 24 is an output chart for the Venn diagram of FIG. 23.
Figure 25E:
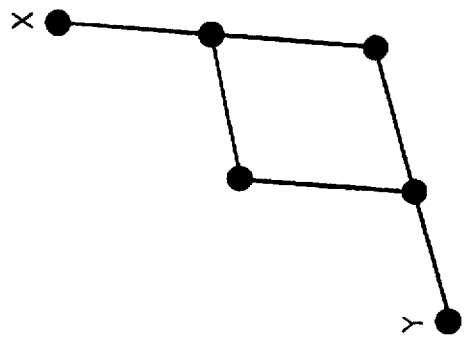
Figure 25D:
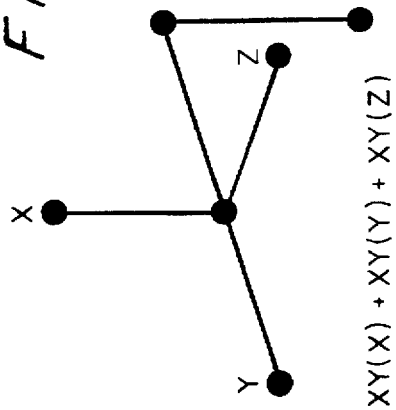
Figure 25F:
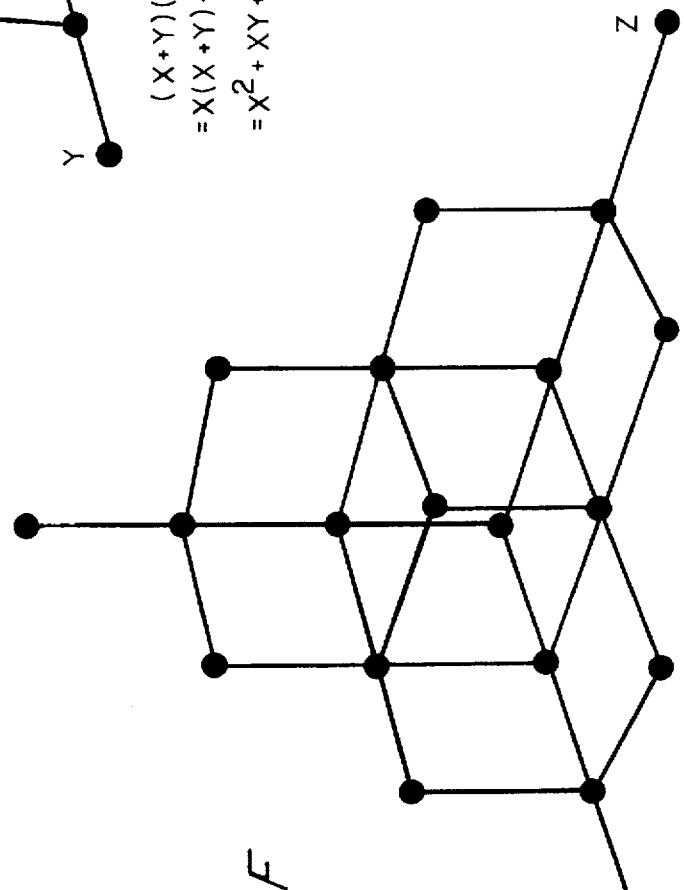
Figure 25H:
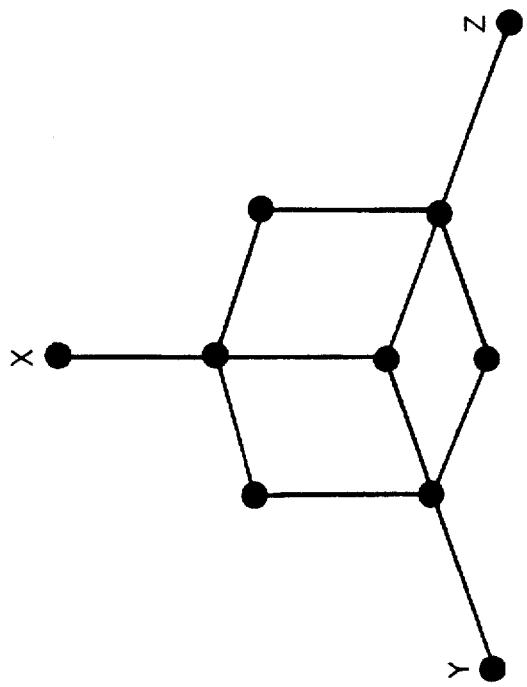
Figure 25G:
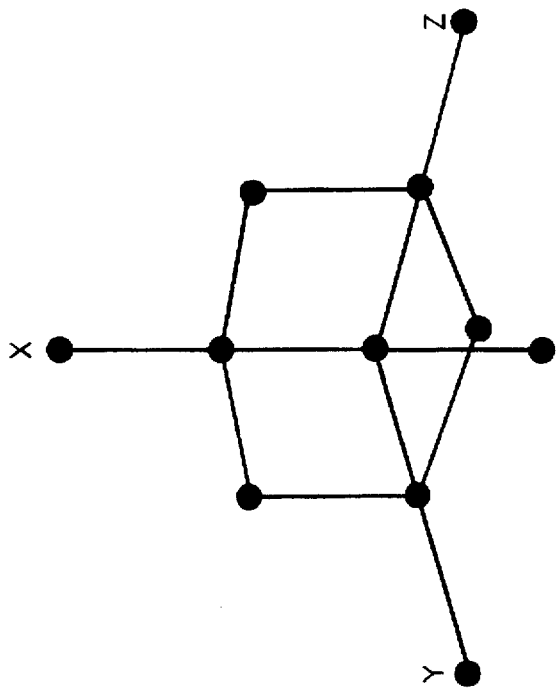
Figure 25I:
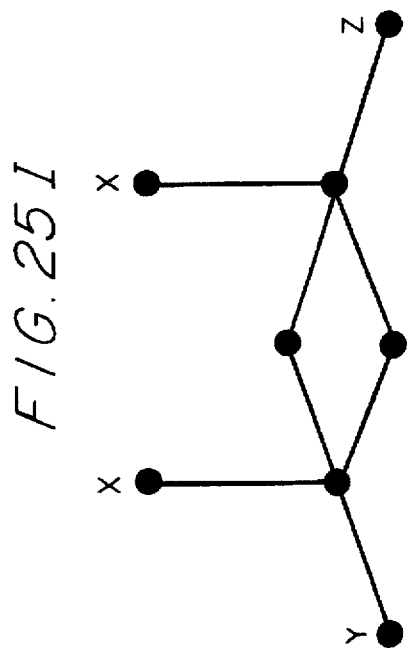
Figure 25J:
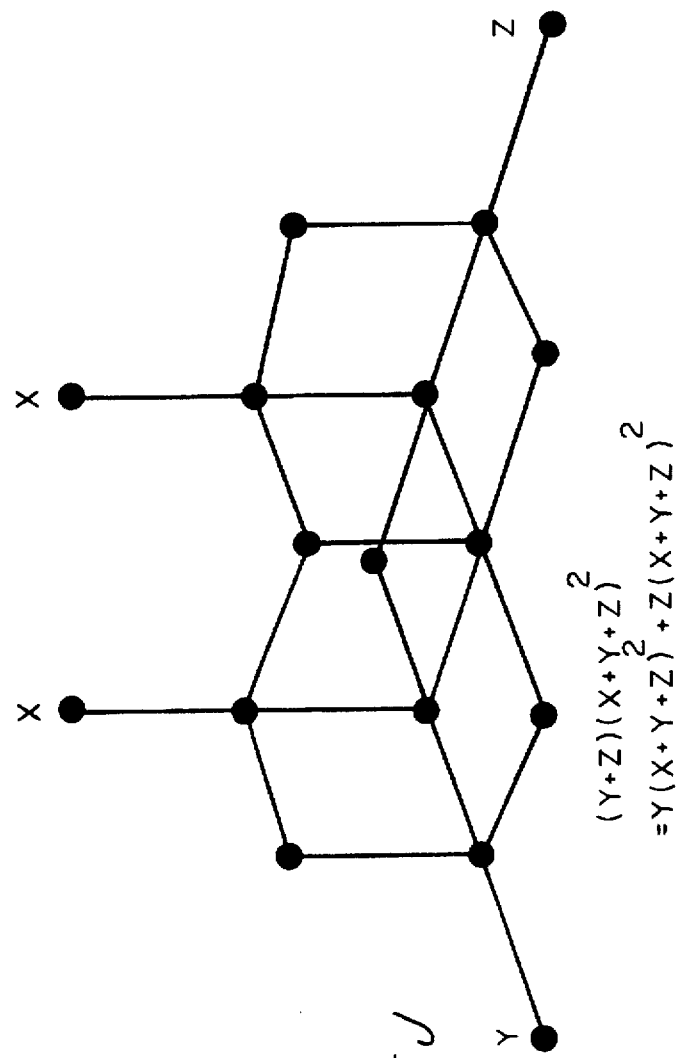

In these versions, we revisit the first and second versions and add tally sheets in which students record relative frequencies with fractions, decimals and percents. Thus, in the second version, the students' relative frequencies may be compared to the "expected" relative frequencies of the standard distribution, FIG. 20.

Fourth Version

In this version, the colors on the dice are assigned prime number values, e.g., 2, 3, 5. In this case, the expansion becomes $(x+y+z)^3=(2+3+5)^3=10^3=1000$. This may be viewed as 1000 points and teams compete to see which team rolls the most points (or which team reaches 1000 first). In this version, once a given combination has been exhausted, e.g., $x^2y$ rolled three different times, it cannot be counted for points. Again, the rolls should be public and each team keeps track of every team's total points, e.g.,

| | Team | | |
|---|---|---|---|
| Dice | Black | Black | Blue |
| Directions combination and its value | x | x $x^2y = (2)^2(3) = (4)(3) = 12$ | y |

As an entry level game, teams get points for each combination they correctly record. At a more competitive level, teams send representatives to judges' tables and the first (two or three) correct results get points.

VARIOUS LATTICE STRUCTURES

FIGS. 25A–25J

Referring now to FIGS. 25A–25J, various lattice structures are shown with corresponding algebraic expressions. As students become increasingly familiar with the information embodied in the lattice 150 of FIG. 12, they may rearrange the legs 154, 156 and 158, nodes 152 and 160, end terminal points 162 of the lattice and then express those rearrangements in the algebraic expressions and expansions associated with each of the FIGS. 25A–25J. Conversely, the students may configure the lattices to conform to given algebraic expressions. The particular arrangements of legs 154, 156 and 158 of FIGS. 25A–25J are merely exemplary of many lattice configurations which may be assembled using the legs and nodes in accordance with the principles of the present invention.

PREFERRED LATTICE COMPONENTS

Figure 26:
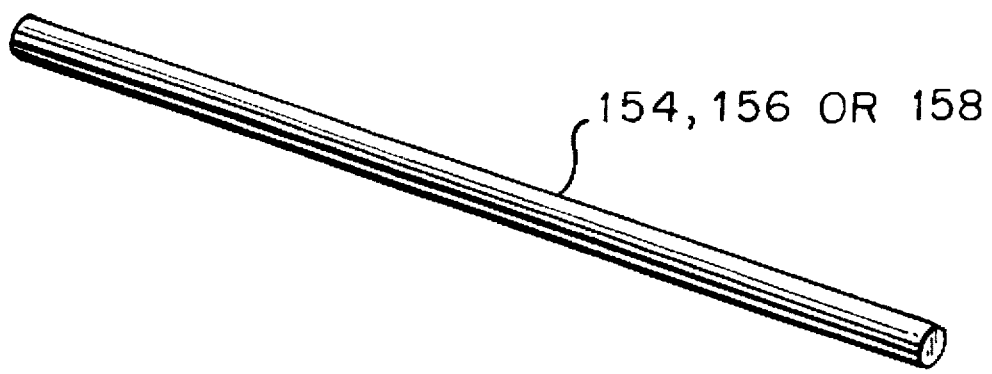
FIG. 26 is a leg used to form a component of the lattice structures of FIGS. 25A–25J.
Figure 27:
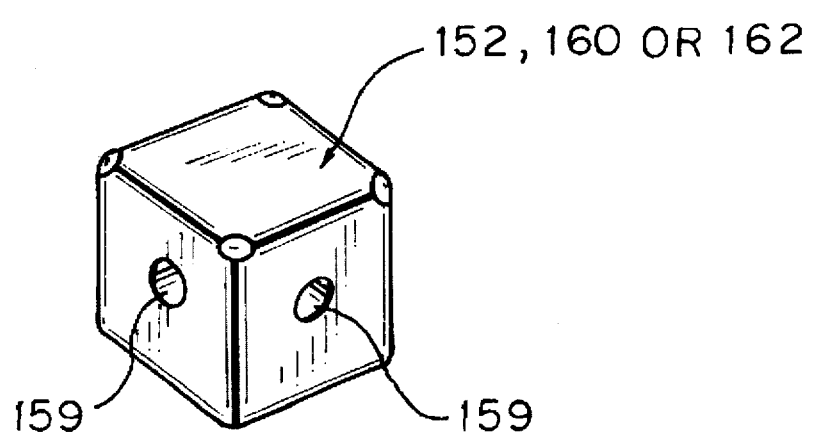
FIG. 27 is a perspective view of a node configured as a block with bores therein to receive the legs such as the leg of FIG. 26.

FIGS. 26 and 27

Referring now to FIGS. 26 and 27, there are shown current configurations for one of the legs 154, 157 or 158 and one of the nodes 152, 160 or 162. Each of the legs 154, 156 or 158 is configured as an elongated dowel having ends which are received in bores 159 of the nodes 152, 160 or 116.

A METHOD OF PLAYING A COMPUTERIZED GAME

The game disclosed in FIGS. 28–38 is preferably played using personal computers but may be played using paper and pencils.

Figure 28:
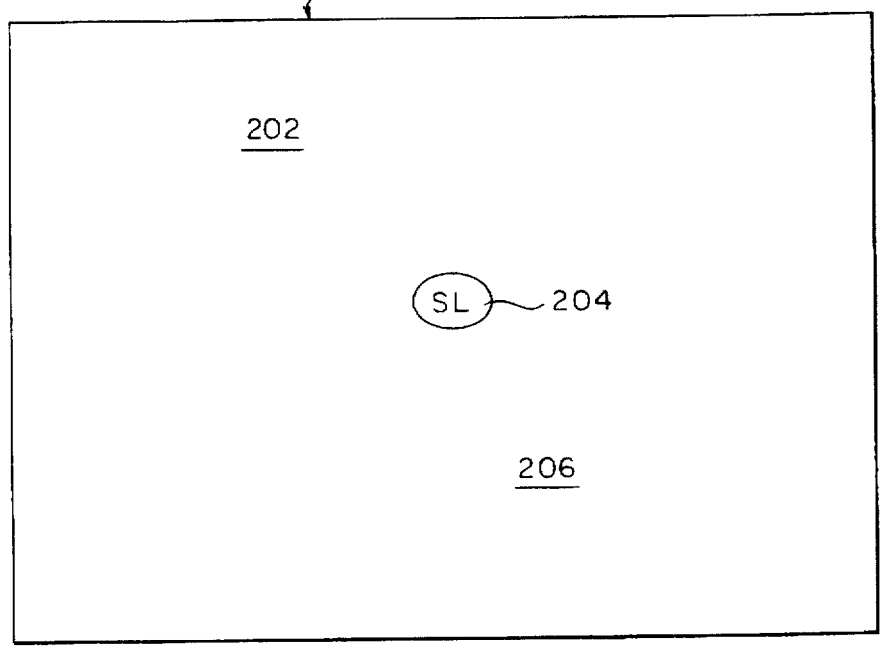
FIG. 28 is a view of a computer monitor screen with a dot used as a starting point play a two-dimensional game thereon.
Figure 29:
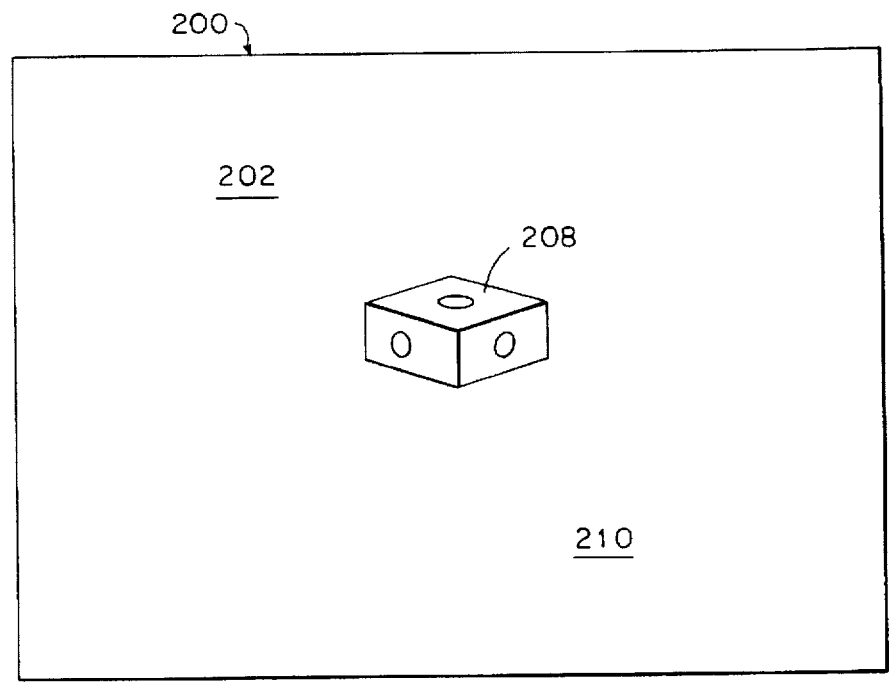
FIG. 29 is a view of the computer monitor screen with a block thereon used as a starting point for a three-dimensional game.

Referring now to FIGS. 28 and 29 which illustrate a display 200 on a computer monitor screen 202 of a conventional personal computer (not shown), it is seen that at a level zero, the only objects on the screen are the starting stations, i.e., one dot 204 on a two-dimensional flagway (2dF) 206 and one block 208 on a three-dimensional flagway 210.

At level zero, the geometrical features are the two-dimensional flagway 206 where the starting station is the dot 204 that lies on a planar surface and the three-dimensional flagway 210 where the starting station is a block 208 that occupies a three-dimensional space. At level zero, the algebraic representations (208) are characterized in that a player has no choices since there are no paths on the flagways to walk along. No color-coded (Red, Blue, Yellow) die can be thrown and no variables ("x", "y", "z") can be assigned to each color. This situation is represented by the expression:

$$(x+y+z)^0 = 1$$

In this representation, "x", "y", "z" represent the three possible outcomes from tossing a color-coded die with three face colors, and "+" represents logical choice, i.e., a player may travel one and only one of the three color-coded (Red, Blue, Yellow) paths on a flagway. The exponent "0" represents the lack of any such choice and the "1" represents the physical structure that results when there is no choice (i.e., the dot 204 on the two-dimensional flagway 206 or the block 208 on the three-dimensional flagway 210).

Figure 30:
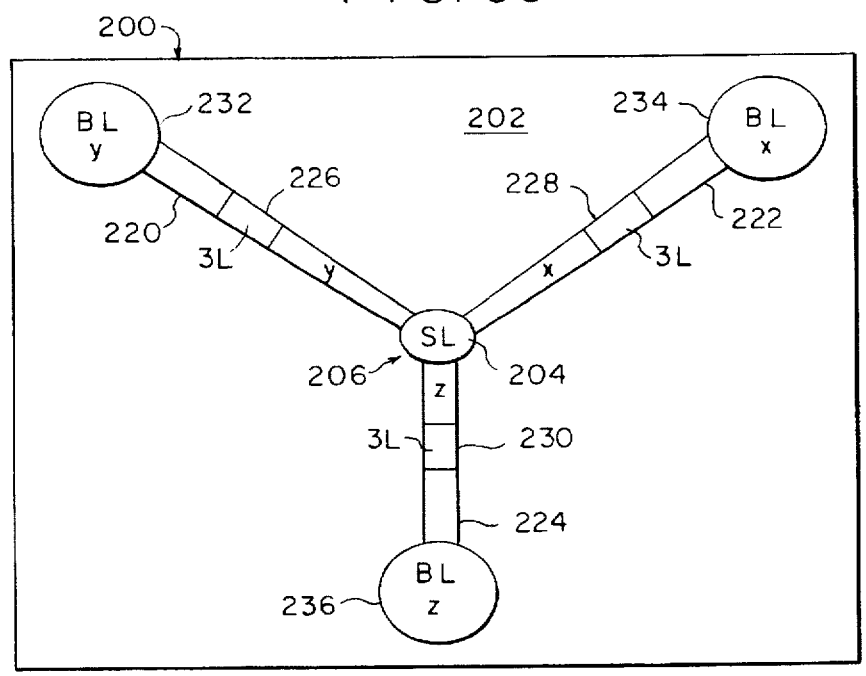
FIG. 30 is a view of a two-dimensional "flagway" as it appears on a computer screen monitor, which flagway is generated from the dot of FIG. 28.

Referring now to FIG. 30, on the two-dimensional flagway 206, the plane surface now has three paths 220, 222 and 224 emanating from the starting station 204. The paths 220, 222 and 224 are color-coded: Red, Blue and Yellow, respectively. The path 220, 222 and 224 have a judge's stations 226, 228 and 230 marked thereon and terminate in a circles (BL) 232, 234 and 236, which is referred to as a "Bumping Locations."

Figure 31:
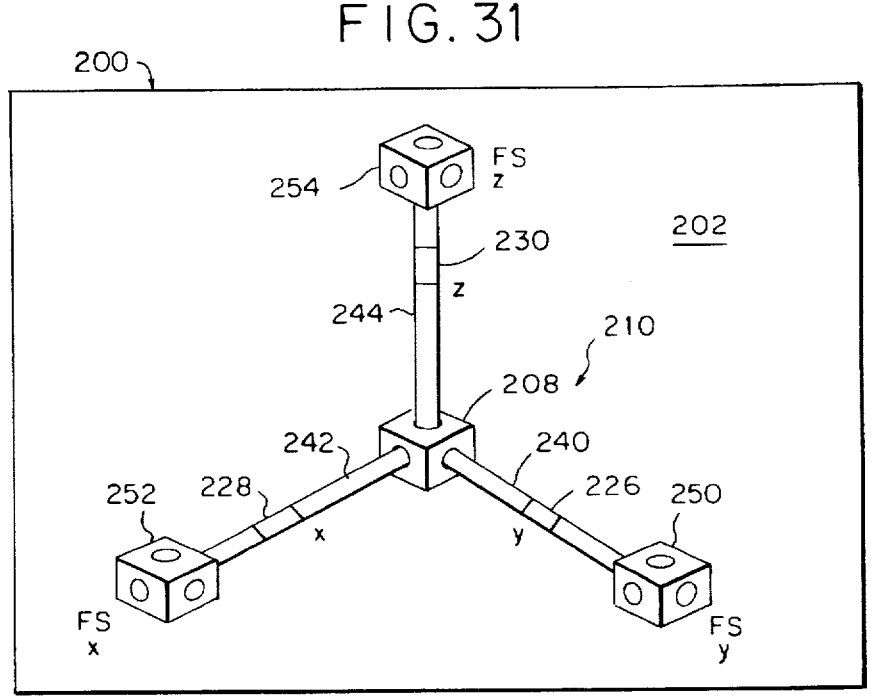
FIG. 31 is an image on a computer monitor of a three-dimensional flagway generated from the block of FIG. 29.

Referring now to FIG. 31, on the three-dimensional flagway 210, the trinomial structure now has three rods 240, 242 and 244 placed pair-wise at right angles to each other. The rods 240, 242 and 244 are color-coded, Red, Blue and Yellow and the rods terminate in a green blocks 250, 252 and 254 which are finish stations (FS) which correspond in placement and function to the "Bumping Locations" BL identified by the reference numerals 232, 234 and 236 of FIG. 30.

Figure 32:
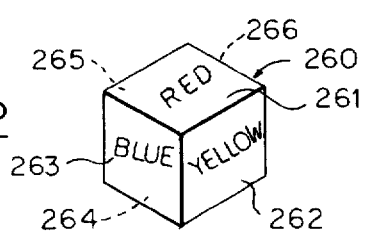
FIG. 32 is a perspective view of a "die" which is used to play the computer game of the present invention.

Referring now to FIG. 32, in playing the game, one color-coded die 260 is used. The die 260 has three colors for six faces 261–266: Red, Blue and Yellow with two faces for each color. Two or more teams play one another with each team having a selected amount of time to play the entire game, as well as selected amounts of time to make given moves during a particular turn of the game. The teams take turns executing "walks" on the flagways 220–224 (FIG. 30) and 240–244 (FIG. 31). A player on a team executes a flagway walk by:

(1) rolling the die 260, (2) writing in the algebra representation in the chart of, FIG. 33 for the result of the roll of the die, and then (3) clicking, when it is the player's turn, on the path they are to walk, thereby entering the judges location (JL) 226–230 on that path.

If the results of actions 1, 2 and 3 are mutually consistent, the Judge at location (226–230) rules that the player executed a Successful Flagway Walk. If not, the Judge (226–230) will rule that the play defaulted that flagway walk. In the event of a Successful Flagway Walk, the player enters the Bumping location (BL) 232, 234 or 236 for his flagway 220, 222 or 224.

A player who reaches a bumper location (BL) 232–234 scores points as follows:

(a) Zero points of the bumping location is occupied by one of that players teammates.

(b) One Point if the bumping location is not occupied.

(c) Two points if the bumping location is occupied by a member of another team.

Every time a die 260 is rolled, a tally will be placed in the appropriate x, y, z cell of the frequency distribution table 267 of FIG. 33. At the end of the game, the students will be responsible for completing the table 267 of FIG. 33 by computing the relative frequencies 268a, 268b and 268c.

A team will receive 16 points for completing the table of FIG. 33. One point for each of the cells of the three relative frequency columns. The cells of each of these four tables may also be formatted as the vertices of a triangle, corresponding to .the finish stations of the three dimensional flagway of FIG. 30.

The algebraic representation for level one flagway game is:

$$(x+y+z)^1 = x+y+z$$

At this level, the exponent "1" represents the fact that only one die 260 is thrown and therefore exactly three color "combinations" occur: Red or Blue or Yellow, represented in the algebra by "x", "y" and "z", respectively, and in the flagway by the three color-coded flagway paths. The "+" represents "or" in the logical sense of mutually exclusive choices. These choices are represented in the physical structure by the paths 220–224 of the two-dimensional flagway 206 and the rods 240–244 of the three-dimensional flagway 210 emanating from a point 204 or a block 208.

A COMPUTER PROGRAM FOR A "BUMPING GAME" FOR THE LEVEL ONE FLAGWAY

In this version of the computer game, two students play together at one monitor taking turns. There is a time limit on the game itself, as well as time limits for making certain moves in the game. Before the game beings, each student fills in the names of the column 268 of the Table 269 of FIG. 34 for the ten players on that student's team. The last there columns 270, 272 and 274 of the table 269 are filled as the game proceeds.

Next, the two lead students assign variables to the colors listed in table 277 of FIG. 35. The variables entered into the key 278 appear on the flagway paths in both the two-dimensional flagway 206 and the three-dimensional flagway 210.

As soon as the team lists of FIG. 33 and the key 278 of FIG. 35 are completed, the flagway 206 or 210 appears on the monitor 200 and the game beings.

Figures 36, 37:
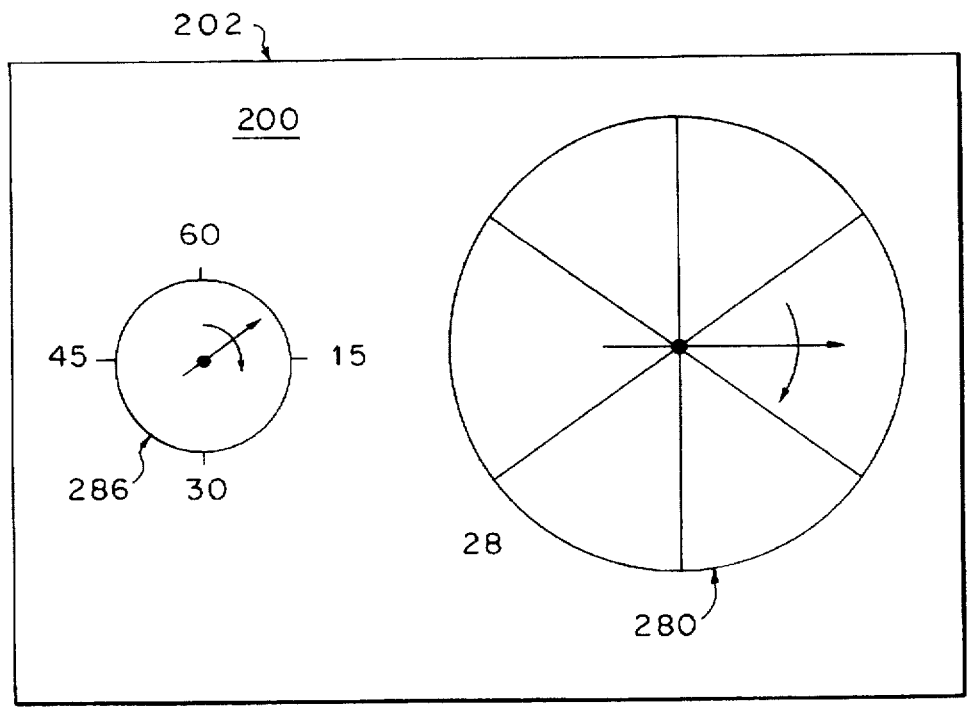
FIG. 36 is an image of a spinner and a timer which appear on the screen of a computer monitor used to play the game of the present invention.
FIG. 37 is an image which appears on a computer screen of a table assigning numbers to flagways.
Figure 38:
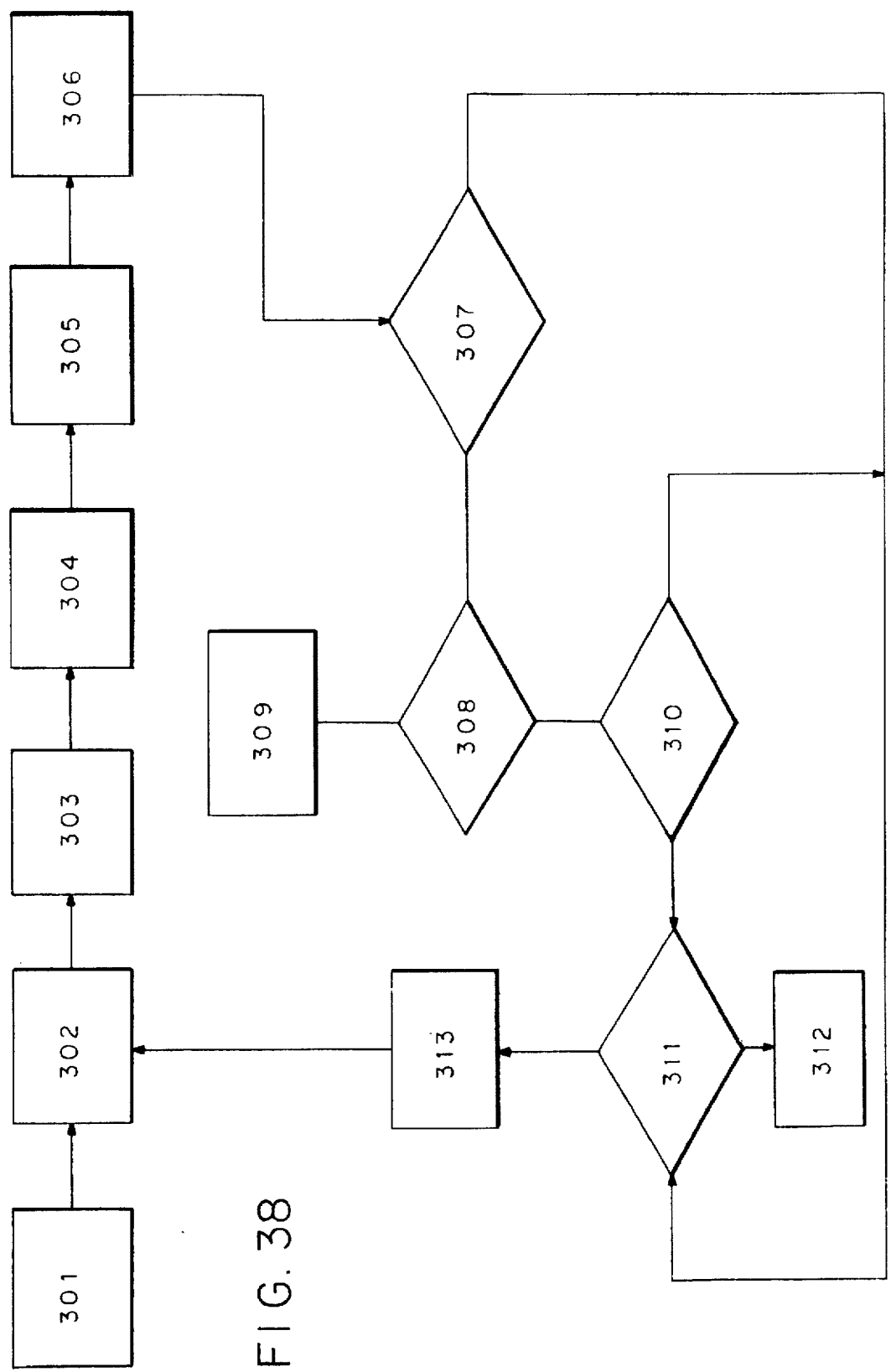
FIG. 38 is a diagrammatical view of a flow chart showing the steps taken in a computer program used for playing the game of the present invention.

The spinner 280 of FIG. 36 (or die tumbler 260) that appears on the monitor 200 will only be available to one player at a time. A timer 286 regulates a player's access to the spinner 280. The spinner 286 generates one of the three colors, Red, Blue or Yellow, via a random number process, and when it does so, the name of the color will appear in the team list for the player whose turn it is to play. The student then types in the variable in col. 272 of FIG. 34, assigned to that color. As soon as the student has entered a variable, the player's symbol appears in the starting circle and the student must click on the correct flagway path 206 or 210 in order for that player to walk the flagway. The player's symbol then appears in the Judge's location 226–230 on that flagway path 222–230 or 240–244 and the Judge renders a decision which is recorded in the team list column 274 for that Player as recorded in column 272. Either the player ran a successful flagway walk, or the player defaulted. If the player defaulted, the player is retired. (Note: in an alternate version of the game, the key appears and, if there is time left in this turn, the player may write in the correct variable and click on the correct flagway path.) If the Judge declares a successful flagway walk, then the player's symbol appears in the bumping location 232–236 or, if the bumping location 232–236 is unoccupied, the player's team scores 1 point; or if the bumping location is occupied by a player of the opponent's team, the player's team scores 2 points; or if the bumping location is occupied by a team member, there are no points gained.

A PROGRAM FOR PLAYING THE GAME

Students play the Bumping flagway games in teams. The winning team scores the most points. To score points, a team sends a player to the flagway 206 or 210 to take one turn. Every time a player takes one turn, the student performs three actions:

(1. rolls a die or rotates a spinner); (2. writes in a variable); and (3. clicks on a flagway path).

The result of performing these three actions lands the player in a Judge's location 226–230, and the Judge makes a decision that the player has made a successful flagway walk (sFw) or a default flagway walk (dFw).

If (player has made a successful flagway walk), then (Player goes to the Bumping location).

If (Player has made a default flagway walk), then (Player is retired and the player's team receives zero points).

If (the BL (232–236) is unoccupied), then (Player occupies BL and scores 1 point).

If (BL (232–236) is occupied by another team), then (Player bumps the other team and scores 2 points).

If (BL (232–236) is occupied by same team member), then (Player occupies BL but scores zero points).

The game is over after both students have exhausted their team lists or time has, elapsed, whichever comes first. The spinner 280 supplies the input values to begin a turn and selects the path: Red, Blue or Yellow. Constant values for successful flagway walks and default flagway walks are generated according to the table 290 of FIG. 37. In accordance with the table 290, a "1" is assigned regardless of color selected by the spinner 280 and then a "0" or a "1" is placed in column 292 according to whether the student makes the correct choice or not in assigning a variable and clicking on a path.

Referring now to FIG. 37, the following algorithm is illustrated by the flow chart 300 in which the following thirteen steps occur:

301. Initialize counter: Player for Team A=Player 1.

302. The symbol for Player 1 appears on the spinner 280 and the student clicks on the spinner.

303. The color rolled by the spinner appears in the team list 269 against Player 1 and the student types in a variable in col. 272 for Player 1 in the team list.

304. Symbol for Player 1 appears at the starting location 204 Or 208 of the flagway 206 or 210 (FIGS. 30 and 31).

305. Student clicks on a flagway path 206 or 210 and Player 1 advances to the Judge's location 226–230 on that path.

306. Judge location 226–230 shows a decision: successful flagway walk=307, or default flagway walk 304 or 305 or 305.

307. If (Judge location=307), the symbol for Player 1 appears in the BL (232–236) or (250–254) of that flagway path 206 or 210, if not Player 1 defaults and is retired.

308. Statement 307 is true and: If (BL is unoccupied), score (team A)=score (team A)+1, else Player 1 bumps occupant.

309. Statement 308 is true and Player 1 is retired.

310. Statement 308 is false and: if (BL occupant is not a member of Team A), score (Team A)=score (Team A).

311. Statement 310 is true and: initialized counter for players of Team A is less than 11.

312. Statement 311 is false and Team A has finished playing.

313. Statement 11 is true and: Player 1=Player (1+1).

Loop continues starting again at 301 for the next player.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of playing a game that teaches mathematical skills and concepts to students, the method comprising:

factoring input numbers from number chips into prime factors;

organizing the numbers which have been factored into first, second and third groups by assigning output values "−1", "0" and "+1", wherein:

if the number of prime factors are odd, the value "−1" is assigned to the number, if the prime factors are even in number, the value "+1" is assigned to the number; and if there are duplicate prime factors indicating that the number has been raised to a power, then the value "0" is assigned to that number;

organizing the input numbers into tables which include individual input numbers, the prime factors thereof, and the output values of "−1", "+1" and "0";

applying the numbers to a location on a lattice, wherein the lattice has legs arranged in sets of three wherein the legs are identified by the expressions "+1", "−1" and "0" with the input numbers being placed at termini of the legs in accordance with whether the value assigned to the input number is "−1", "0" or "+1"; and retiring output numbers to a frequency table, wherein the output numbers are organized in the frequency table according to the values "−1", "0" and "+1".

2. The method of claim 1, wherein the students are organized in teams and each student selects a plurality of input numbers to factor.

3. The method of claim 2, wherein the teams simultaneously select their input numbers to be factored.

4. The method of claim 2, wherein the students select the input numbers to be factored in relay teams.

5. The method of claim 2, wherein the lattice is organized into a plurality of legs with starting and terminal points, the legs branching from a central point and each terminus in sets of threes and being identified by the designations "−1", "0" and "+1", wherein paths are defined by legs having the same "−1", "0" and "+1" designations and wherein the game is won by students who capture the most paths back to the starting point.

6. The method of claim 2, further including dice for generating the input numbers, wherein the dice have faces of various colors which have been assigned prime numbers.

7. The method of claim 6, further comprising using a Venn diagram with three areas which have portions that mutually overlap, the areas having the same colors as the colors on the die with the overlapping areas having colors created by the mixtures of the colors on the die and wherein the areas are assigned prime factors which are also assigned to the faces of the die in accordance with the color of the faces.

8. The method of claim 2, wherein the lattice is a three-dimensional lattice having legs which extend in the X, Y and Z directions from nodes which are repeated in the lattice out to terminal points of the lattice.

9. A method of playing a game, that teaches mathematical skills and concepts to students organized into teams, the method comprising:

a player selecting a variable value by chance from a preselected number of variable values;

recording the variable value on a chart;

identifying a path on a multi-path display which corresponds to the variable value;

determining if the variable value selected by chance is correctly recorded and if the path selected corresponds to the variable value selected;

entering a location at the terminus of the path; and awarding points to the player according to whether the location is unoccupied, occupied by a member of another team or occupied by a member of the same team.

10. The method of claim 9, further comprising the steps of tallying the variable values to determine frequency distribution thereof and awarding points for correct frequency determinations.

11. The method of claim 9, wherein the variable values are selected from color coded faces of a die, the color-coded faces of the die matching colors of the paths.

12. A method of claim 11, wherein there are three colors on the faces of the die, three colors corresponding to the expressions "x", "y" and "z".

13. The method of claim 12, wherein students are organized into two teams and further including the step of signing a variable value to the colors prior to selecting the variable value by chance.

14. The method of claim 13, further including the step of regulating the time that each player has to make a decision as to the path to select as a result of selecting the variable value by chance.

* * * * *